(12) United States Patent
Tamilarasan et al.

(10) Patent No.: US 12,093,183 B1
(45) Date of Patent: Sep. 17, 2024

(54) CACHING TECHNIQUES USING A MAPPING CACHE AND MAINTAINING CACHE COHERENCY USING PHYSICAL TO LOGICAL ADDRESS MAPPING

(71) Applicant: Dell Products L.P., Hopkinton, MA (US)

(72) Inventors: Ashok Tamilarasan, Shrewsbury, MA (US); Vamsi K Vankamamidi, Hopkinton, MA (US); Amitai Alkalay, Kadima (IL)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/119,565

(22) Filed: Mar. 9, 2023

(51) Int. Cl.
*G06F 12/08* (2016.01)
*G06F 12/0891* (2016.01)
*G06F 12/0893* (2016.01)

(52) U.S. Cl.
CPC ...... *G06F 12/0891* (2013.01); *G06F 12/0893* (2013.01); *G06F 2212/1024* (2013.01)

(58) Field of Classification Search
CPC .. G06F 12/08; G06F 12/0891; G06F 12/0893; G06F 12/0895; G06F 12/1009
See application file for complete search history.

(56) References Cited

U.S. PATENT DOCUMENTS 9,164,702 B1 * 10/2015 Nesbit ............... G06F 3/061
9,582,421 B1 * 2/2017 Agarwala ........... G06F 3/0689
10,754,789 B1 * 8/2020 Volpe ............... G06F 12/08

(Continued)

FOREIGN PATENT DOCUMENTS

WO  WO-2010010351 A1 * 1/2010 ......... H04L 12/4625
WO  WO-2012174128 A1 * 12/2012 .......... G06F 12/0811

(Continued)

OTHER PUBLICATIONS

S. Sudevalayam, P. Kulkarni, R. Balani and A. Verma, "DRIVE: Using implicit caching hints to achieve disk I/O reduction in virtualized environments," 2014 21st International Conference on High Performance Computing (HiPC), Goa, India, 2014, pp. 1-10.*

(Continued)

*Primary Examiner* — Pierre Michel Bataille
(74) *Attorney, Agent, or Firm* — Muirhead and Saturnelli, LLC

(57) ABSTRACT

Caching techniques can include: receiving a read I/O operation requesting to read from a logical address; determining whether a mapping cache includes a descriptor for the logical address, the mapping cache including two hash tables; responsive to determining that the mapping cache includes the descriptor for the logical address, performing read hit mapping cache processing which includes using a physical location identified by the descriptor to read content stored at the logical address; and responsive to determining that the mapping cache does not include the descriptor for the logical address, performing read miss mapping cache processing which includes adding the descriptor to the mapping cache. Read miss mapping cache processing can include adding the descriptor to a first hash table, used to access the descriptor by the logical address, and adding the descriptor to a second hash table used to access the descriptor by the physical location.

20 Claims, 26 Drawing Sheets

(56) References Cited

U.S. PATENT DOCUMENTS

| | | | |
|---|---|---|---|
| 2015/0186464 A1* | 7/2015 | Seputis | G06F 16/24539 |
| | | | 707/718 |
| 2019/0294551 A1* | 9/2019 | Abhishek Raja | G06F 12/1027 |
| 2023/0029706 A1* | 2/2023 | Baruch | G06F 12/0864 |
| 2024/0045802 A1* | 2/2024 | Swaine | G06F 12/0811 |

FOREIGN PATENT DOCUMENTS

| | | | | |
|---|---|---|---|---|
| WO | WO-2019155261 A1 * | 8/2019 | | |
| WO | WO-2022010470 A1 * | 1/2022 | | G06F 21/602 |

OTHER PUBLICATIONS

Zhenghong Wang and R. B. Lee, "A novel cache architecture with enhanced performance and security," 2008 41st IEEE/ACM International Symposium on Microarchitecture, Como, Italy, 2008, pp. 83-93.*

U.S. Appl. No. 18/118,946, filed Mar. 8, 2023, entitled Caching Techniques Using a Mapping Cache and Maintaining Cache Coherency Using Hash Values, to Ashok Tamilarasan, et al.

* cited by examiner

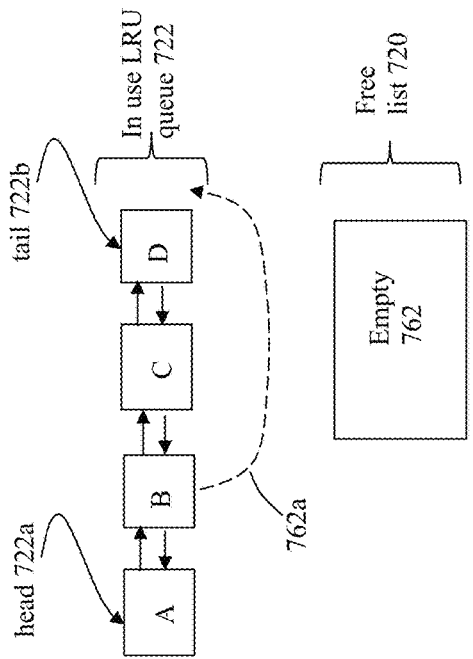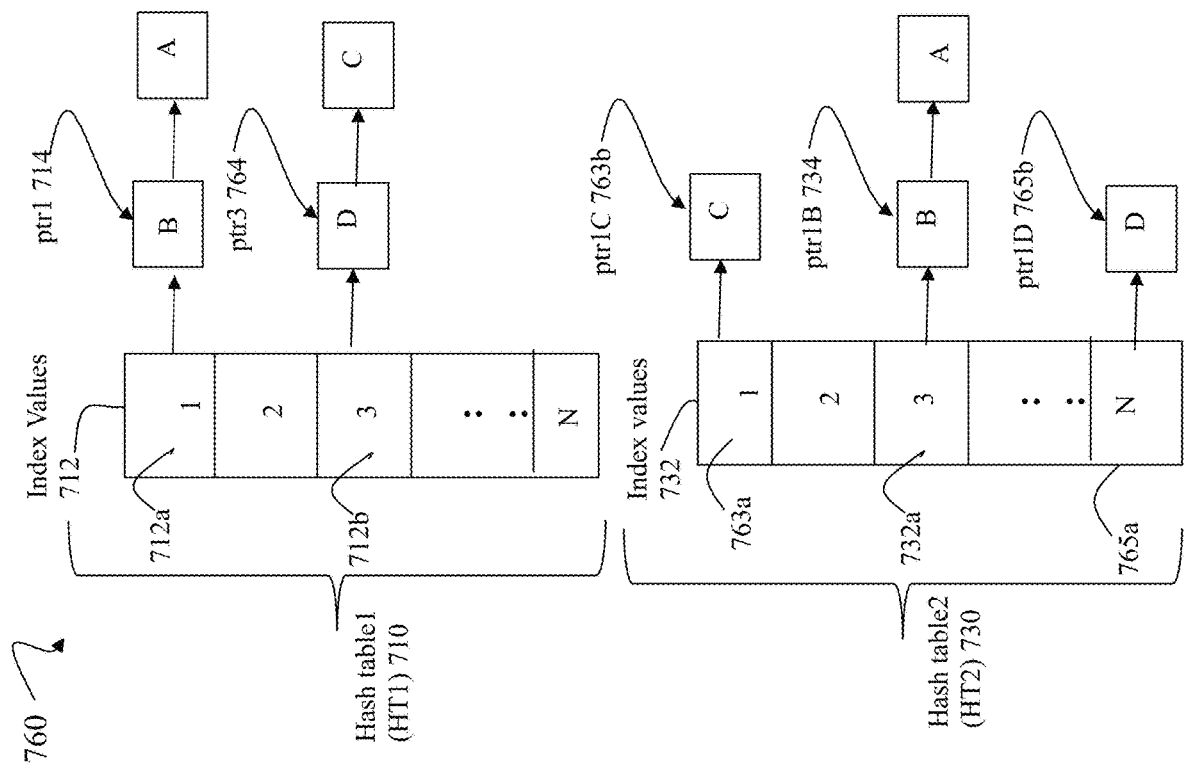
FIG. 7C

850

Page descriptor 852

- Forward pointer 852a
- Backward pointer 852b
- Physical location information of content 852c (e.g., PLB address, offset and length)
- Core ID and queue ID 852d
- Logical address 852e (e.g., LUN or volume and LBA)
- Hash table1 (HT1) pointer 852f
- Hash table 2 (HT) pointer 852g
- Checksum/CRC 852h

FIG. 9

902 — Receive a request for a new page descriptor to be added to the 2 hash tables, HT1, HT2, of the mapping cache. The page descriptor request can be triggered by one of multiple defined operations which results in promoting or adding a descriptor to the mapping cache, the associated hash tables and an in use LRU queue.

The triggering operation can be flushing a logged write I/O operation from the log, where the write I/O writes content C1 to a target logical address LA1. Flushing includes storing C1 to a new physical storage location on BE non-volatile storage.

The triggering operation can be a read I/O operation which is a request to read content C1 from LA1, where the read operation results in a mapping cache miss (e.g., miss with respect to the hash table HT1 of the mapping cache). As a result, C1 is read from a physical storage location on non-volatile BE storage using the mapping information of the chain of MD pages mapping LA1 to the physical storage location. Reading C1 from the non-volatile BE storage can trigger the request to add the new page descriptor, as used to access C1, to the mapping cache.

The triggering operation can be optionally performed responsive to garbage collection processing which relocates content C1 of LA1 from a source physical location to a new target or second physical storage location on non-volatile BE storage. The new page descriptor can be added to the mapping cache, where the new page descriptor can be used to access C1 of LA1, where C1 is now stored at the new target or second physical storage location. The new page descriptor can include information identifying LA1 and the new target or second physical storage location.

The request can generally be made when there is a need for the new page descriptor which is then updated and stored in the mapping cache in subsequent steps.

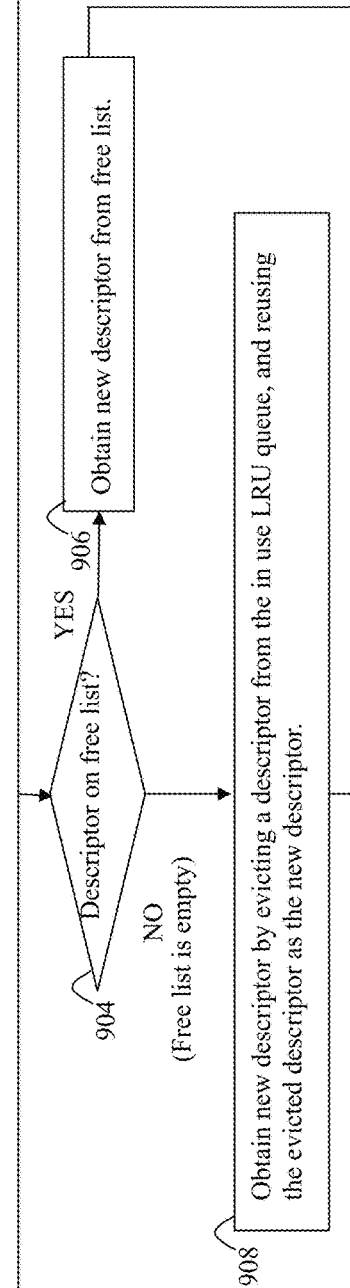

FIG. 10A

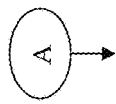

910 Update or fill in the information of the new descriptor. The physical location information 852c of the new descriptor can be updated to denote the physical location of C1 on non-volatile BE storage. The logical address 852e of the new descriptor can be updated to denote the logical address LA1 having content C1 stored at LA1.

The new descriptor can be added to the hash table1 HT1 of the mapping cache. The index j can be determined for LA1 using a hash function F1, where F1(LA1)=j, and the new descriptor is added to the bucket or linked list of descriptors associated with HT1(j). The new descriptor can be added or linked to the bucket list of HT1(j) using the head pointer of the linked list and the hash table HT1 pointer 852f (which points to the next entry in the list, if any).

The new descriptor can be added to the hash table1 HT2 of the mapping cache. The index j2 can be determined for LA1 using a hash function F2, where F2(LA1)=j2, and the new descriptor is added to the bucket or linked list of descriptors associated with HT2(j2). The new descriptor can be added or linked to the bucket list of HT2(j2) using the head pointer of the linked list and the hash table2 HT2 pointer 852g (which points to the next entry in the list, if any).

The new descriptor can be added to the tail of the in use LRU queue using the forward and backward pointers 852a-b of the new descriptor. In embodiments using multiple in use LRU queues, such as described in connection with Figure 8, the core ID and queue ID field 852d can further identify the particular in use LRU queue to which the new descriptor is added.

912 Compress C1 and store the compressed form of C1 in the physical storage location denoted by the physical location information field 852c of the descriptor.

1202 — Garbage collection processing relocates content C1 stored at logical address LA1 from a first physical address or location PA1 (e.g., a source physical address or location) to a second physical address or location PA2 (a destination physical address or location). A descriptor D1 corresponding to LA1 and PA1 can be currently cached in the mapping cache and included in both the first hash table HT1 and the second hash table HT2. Additionally, D1 can be currently included in an in use LRU queue. With the GC relocation of C1 from PA1 to PA2, cached D1 of the mapping cache is now invalid.

Responsive to the GC relocation of C1 from PA1 to PA2 thereby invalidating D1 of the mapping cache, subsequent processing steps can be performed to evict the invalid D1 from the mapping cache. In particular, subsequent processing steps can include updating relevant mapping information, evicting the invalid descriptor D1 from both HT1 and HT2, evicting D1 from the in use LRU queue currently including D1, and adding the evicted descriptor D1 to the free list or queue of free descriptors available for use.

LA1 can be used as a key to index into HT1, where LA1 is mapped, by a hash function F1, to an index k1 of HT1, and where F1(LA1)=k1. PA1 can be used as a key to index into HT2, where PA1 is mapped, by a hash function F2, to an index k2 of HT2, where F2(PA1)=k2.

1204 — Mapping information including the chain of metadata pages can be updated, where the mapping information is updated to map LA1 to PA2 rather than PA1. In particular, the VLB entry of the VLB page of the chain of mapping information can be updated so that the VLB entry references or points to PA2 rather than PA1.

1206 — Using PA1 (the old or source physical address or location) and the second hash table HT2, index into HT2 to locate a corresponding descriptor D1. PA1 can be used as the key for HT2. PA1 can be hashed using the hash function F2 to determine the corresponding index k2 of HT2, where F2(PA1)=k2 and HT2(k2) includes or is associated with D1. PA1 can be stored as a value in a field of D1. Additionally, LA1 can be stored as a value in D1. Processing can include verifying that D1 includes a stored physical address or location S2 which matches PA1.

Index or entry k2 of HT2 can be associated with a bucket list or linked list of descriptors storing physical addresses or locations of content which are mapped, by F2, to the index or entry k2. If the bucket or linked list of entry k2, HT2(k2), includes multiple descriptors, the particular descriptor of interest can be located by searching for a matching one of the multiple descriptors of the bucket or linked list of entry k2 including the stored physical address S2 which matches PA1. Thus, D1 is the matching descriptor which includes S2 matching PA1.

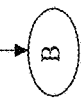

FIG. 13A

CACHING TECHNIQUES USING A MAPPING CACHE AND MAINTAINING CACHE COHERENCY USING PHYSICAL TO LOGICAL ADDRESS MAPPING

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving, from a host, a read I/O operation requesting to read from a first logical address; determining whether a mapping cache includes a first descriptor corresponding to the first logical address, wherein said mapping cache includes a first hash table which maps logical addresses to corresponding descriptors, and wherein said mapping cache includes a second hash table which maps physical addresses to corresponding descriptors, wherein said determining whether the mapping cache includes the first descriptor further includes: mapping the first logical address to a first index of the first hash table; determining whether the first index of the first hash table is associated with the first descriptor corresponding to the first logical address; responsive to determining that the first index of the first hash table is not associated with the first descriptor corresponding to the first logical address, determining that the mapping cache does not include the first descriptor corresponding to the first logical address; and responsive to determining that the first index of the first hash table is associated with the first descriptor corresponding to the first logical address, determining that the mapping cache does include the first descriptor corresponding to the first logical address; and responsive to determining that the mapping cache includes the first descriptor corresponding to the first logical address, performing read hit mapping cache processing which includes using a first physical location identified by the first descriptor to read first content stored at the first logical address; and responsive to determining that the mapping cache does not include the first descriptor corresponding to the first logical address, performing read miss mapping cache processing which includes adding the first descriptor to the mapping cache, wherein said adding the first descriptor to the mapping cache includes adding the first descriptor to the first hash table, which is used to access the first descriptor using the first logical address, and adding the first descriptor to the second hash table, which is used to access the first descriptor using the first physical location.

In at least one embodiment, read hit mapping cache processing can include: obtaining first physical location information from the first descriptor of the first hash table, wherein the first physical location information identifies the first physical location on non-volatile storage including the first content stored at the first logical address; reading, using the first physical location information, the first content from the first physical location; performing validation processing to validate the first content using a first checksum included in the first descriptor; and responsive to said validation processing successfully validating the first content, returning the first content to the host. Validation processing to validate the first content can include: computing a second checksum for the first content read in said reading; determining whether the first checksum of the first descriptor matches the second checksum; and responsive to determining that the first checksum and the second checksum match, successfully validating the first content; and otherwise invalidating the first content and failing validation processing of the first content.

In at least one embodiment, read miss mapping cache processing can include: using mapping information including a chain of metadata pages which maps the first logical address to the first physical location including the first content; reading the first content from the first physical location; obtaining the first descriptor; updating the first descriptor with first information including the first logical address and including first physical location information identifying the first physical location; and returning the first content to the host. Read miss mapping cache processing can include: mapping the first logical address to the first index of the first hash table; adding the first descriptor to a first linked list of descriptors associated with the first index of the first hash table; mapping the first physical location to a second index of the second hash table; and adding the first descriptor to a second linked list of descriptors associated with the second index of the second hash table.

In at least one embodiment, the first descriptor can be cached in the mapping cache, and wherein the first content, denoting current content stored at the first logical address, can be relocated from the first physical location to a second physical location as a result of garbage collection processing performed on non-volatile backend storage including the first physical location and the second physical location. The method can be performed in a data storage system which implements a log structured system where write I/O operations received are recorded in a log and subsequently flushed from the log.

In at least one embodiment, processing can include: responsive to said garbage collection processing relocating the first content from the first physical location to the second physical location, perform first processing including: evicting the first descriptor from the mapping cache, wherein said evicting the first descriptor includes evicting the first descriptor from the first hash table and the second hash table. The first processing can include: mapping the first logical address to the first index of the first hash table; locating the first descriptor in a first linked list associated with the first index of the first hash table; and removing the first descriptor from the first linked list. The first processing can include: using first physical location information of the first descriptor of the first linked list associated with the first index of the first hash table to obtain the first physical location; mapping the first physical location to a second index of the second hash table; locating the first descriptor in a second linked list associated with the second index of the second hash table; and removing the first descriptor from the second linked list. The first processing can include adding a second descriptor to the mapping cache, wherein the second descriptor includes second information identifying that the first content of the first logical address is stored at the second physical location. Adding the second descriptor to the mapping cache can include: adding the second descriptor to the first hash table; and adding the second descriptor to the second hash table. Adding the second descriptor to the second hash table can include: mapping the second physical location to a third index of the second hash table; and adding the second descriptor to a third linked list associated with the third index of the second hash table Adding the second descriptor to the first hash table can include: mapping the second physical location to the first index of the first hash table; and adding the first descriptor to the first linked list associated with the first index of the first hash table. The first processing can include updating mapping information for the first logical address, including updating the mapping information to map the first logical address to the second physical location rather than the first physical location. The mapping information can include a plurality of pages of metadata, wherein a first of the pages is updated to map to the second physical location rather than the first physical location.

In at least one embodiment, processing can include: receiving a first write I/O operation at the data storage system, wherein the first write I/O writes the second content to the first logical address; responsive to said receiving the first write I/O operation, recording a first record in the log for the first write I/O operation; flushing the first record denoting the first write I/O operation from the log; and storing the second content to a second physical location. Responsive to receiving the first write I/O operation, processing can include evicting an existing descriptor from the mapping cache, where the existing descriptor corresponds to the first logical address. Responsive to flushing processing can include caching a second descriptor for the first logical address and the second physical location in the mapping cache, wherein said caching the second descriptor can include adding the second descriptor to the first hash table and adding the second descriptor to the second hash table. The mapping cache can include a plurality of descriptors including the first descriptor, wherein each of the plurality of descriptors can be included in both the first hash table and the second hash table, and wherein said each descriptor can also be included in a first in use queue of one or more in use queues used for managing the mapping cache. The first in use queue can include one or more of the plurality of descriptors ordered in accordance with a least recently used policy. Processing can include: responsive to flushing, requesting a free descriptor; responsive to requesting a free descriptor, determining there is no free descriptor; responsive to determining there is no free descriptor, evicting another descriptor from the mapping cache; and using the evicted another descriptor as the second descriptor.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 7A-7E and FIG. 8 are examples illustrating cached descriptors of the mapping cache and associated structures that can be used in at least one embodiment in accordance with the techniques of the present disclosure.

FIG. 9 is an example of information that can be included in a cached descriptor of the mapping cache in at least one embodiment in accordance with the techniques of the present disclosure.

FIGS. 10A, 10B, 11A, 11B, 11C, 12, 13A and 13B are flowcharts of processing steps that can be performed in at least one embodiment in accordance with the techniques of the present disclosure.

DETAILED DESCRIPTION OF EMBODIMENT(S)

Figure 1:
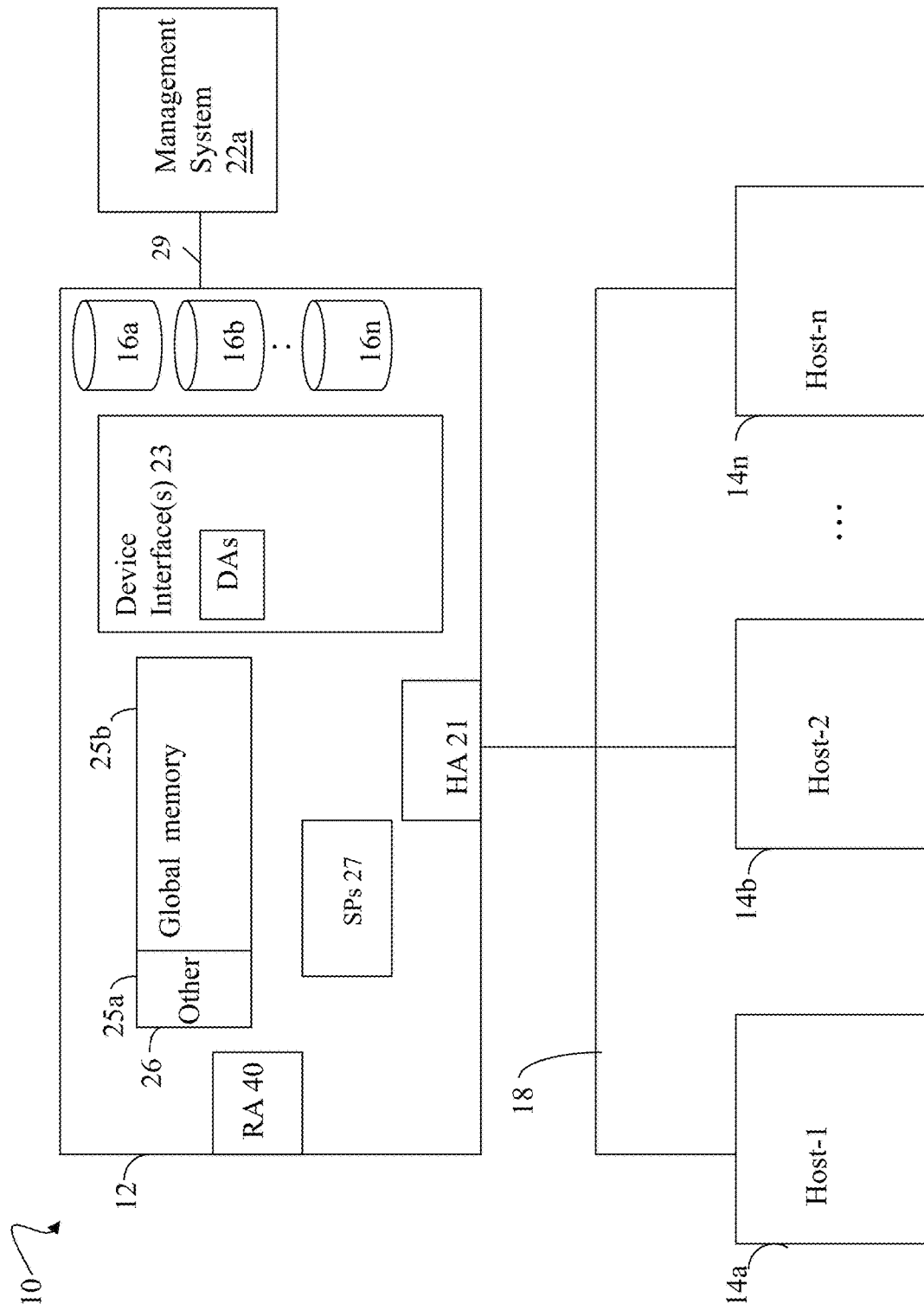
FIG. 1 is an example of components that may be included in a system in accordance with the techniques of the present disclosure.

A data storage system can be a log based system or log structured system (LSS) which persistently records write I/O operations, as well as possibly other operations, in a log. Subsequently, the persistently recorded operations can be flushed from the log. Use of the log provides for improved I/O performance and improved I/O latency.

Generally, an LSS can be characterized by allowing new writes to be directed to free or unused space on a data storage device, and by performing garbage collection that allows holes of storage including unused or invalid data to be compacted and reused. In an LSS, newly written data can be appended to one end of a circular logical log structure in a sequential manner. As newly written data provides updated values for existing data stored at a logical address, the storage containing the existing data can be invalidated and freed for reuse. With an LSS used for recording or logging client write I/O operations, written content or data is recorded in the log at new log locations, and then flushed from the log records, where the written content or data is stored at a next free or available physical storage location on longer term backend (BE) non-volatile storage. Thus, when a logical address with original content stored at a first physical location is updated or overwritten with new content, the new content can be stored at a second physical location which is different from the first physical location. Mapping information can be maintained that translates or maps a user or client logical address to a corresponding physical location storing the current content of the logical address. As new content is written or overwritten to a logical address, the corresponding mapping information can be updated to identify the physical address or location storing the current or most up-to-date content of the logical address. The mapping information can include multiple layers or levels of translation. For example, the mapping information in one system can include a chain of multiple metadata (MD) pages which are accessed and traversed to obtain the desired content for a corresponding logical address. Since the data storage system can include exabytes or even petabytes of stored user data, all the mapping information used to access such stored user data can be maintained on BE non-volatile storage.

Existing systems, such as data storage systems, can maintain and utilize a data cache to store frequently accessed pages of user data or content. The data cache can be, for example, a form of fast volatile memory such as a volatile form of random access memory (RAM) where cached content or data can be accessed and organized by logical address. In particular, the data cache can be used as a read data cache to store user data which is frequently read. For a read I/O requesting read data, the read data which is stored in the cache results in a cache hit or read cache hit. For a read cache hit, the requested read data can be retrieved from the cache and returned to the requester or originator of the read I/O. If the requested read data is not in the cache, a cache miss or read cache miss results where the requested read data can be retrieved from longer term BE non-volatile storage. A cache miss as compared to a cache hit results in an I/O performance penalty and increased I/O latency in order to service the read I/O and return the requested read data to the requester. Thus, use of the data cache can provide for read cache hits and optimized performance such as by providing for improved I/O latency and improved utilization of system resources. Generally, the data cache, as well as the cache in general, can be characterized as a critical and expensive resource which can have a limited size or capacity. Accordingly, due to the typical large size of user data in a system, it is not possible to cache all user data in the cache. As a result, a read cache miss can occur when servicing a read I/O received at the data storage system. In order to access the read data needed to service the read I/O which triggered the read cache miss, corresponding mapping information can be read and used to access the physical location on BE non-volatile storage containing the requested read data. Accessing and traversing multiple layers, levels or pages of mapping information can be time consuming and increase I/O latency. As noted above, the mapping information can be stored on BE non-volatile storage which incurs additional performance penalties to access. Thus, a system can also store mapping information in the cache. However, as with the user data and the limited size of the cache, not all mapping information for all user data can be stored in the cache. As a result, accessing the multiple layers or levels of mapping information which can be needed for accessing the read data to service a read cache miss can result in additional cache misses.

Accordingly, described in the present disclosure are techniques that overcome the above-noted drawbacks and provide for improved reach cache miss performance and improved use of cache. In at least one embodiment, a mapping cache can be maintained. The mapping cache can be used to bypass using the chain of mapping information and also bypass using the data cache (e.g., where the user data or content is maintained and organized in the data cache, and accessed or indexed by logical address). In at least one embodiment the mapping cache can be implemented using structures including two hash tables. In at least one embodiment, each cached page descriptor (sometimes simply referred to herein as descriptor) can be included in both of the two hash tables. A first hash table1 HT1 of the mapping cache can be maintained with the key being a logical address which is mapped to a corresponding page descriptor (sometimes simply referred to herein as descriptor), where the descriptor includes a physical address or physical location information of content stored at the logical address. A second hash table2 HT2 of the mapping cache can be maintained with the key being the physical address or physical location information which is mapped to a corresponding descriptor, where the descriptor also includes the logical address having its content stored at the physical address or physical address location used to index into HT2. Thus, the same cached descriptor can be included in both HT1 and HT2 of the mapping cache. Each cached page descriptor can include a logical address and can also include physical location information, such as an address, pointer or reference to the physical location containing the current or up-to-date content stored at the logical address (of the descriptor). In at least one embodiment, the size of descriptors stored in the mapping cache can generally be much smaller than the actual content or user data (as may be stored using a traditional data cache). In at least one embodiment, the mapping cache can be used and implemented rather than a traditional data cache of user data which is organized using logical addresses as keys and which provides for returning content stored at a particular logical address. In at least one embodiment, the mapping cache can be implemented rather than maintain and implement the data cache to cache frequently accessed content or user data. Generally, for a specified number of logical addresses, the amount of cache consumed to store corresponding descriptors for the logical addresses is expected to be much less than the amount of cache consumed to store the actual content or user data stored at the logical addresses. Thus it can be expected that a much larger number of descriptors can be stored in an amount of cache as compared to the number of logical addresses whose content can be stored in the same amount of cache.

In at least one embodiment, read I/O processing which reads data from a target logical address can include querying the first hash table1 HT1 of the mapping cache. A lookup of the hash table1 HT1 can be performed using the target logical address as the key. A hash function F1 can be used which maps the target logical address LA to an entry or index j of the hash table1 HT1 (e.g., F1(LA)-HT1(j)). If the mapped entry or index HT1(j) does include a corresponding page descriptor for the target logical address, a hit occurs with respect to the mapping cache and thus hash table 1 HT1 thereof. Alternatively, if the mapped entry or index HT1(j) does not include a corresponding page descriptor for the target logical address, a miss occurs with respect to the mapping cache and thus hash table1 HT1 thereof. Responsive to the hit with respect to the hash table1 HT1 of the mapping cache, the corresponding page descriptor as stored in, or associated with, HT1(j) of the mapping cache can be used to access the requested read data stored at the target logical address. In at least one embodiment, the page descriptor can include the target logical address; and also physical location information such as a pointer, address or reference to the physical storage location containing the requested read data stored at the target logical address. Thus, processing the read I/O responsive to the hit with respect to the hash table1 (e.g., HT1(j)) of the mapping cache can include reading the requested read data using the pointer, address or reference to the physical storage location of the page descriptor returned by the query or lookup in the hash table1 HT1. In at least one embodiment, the hash table1 HT1 can include "N" entries or hash lines, where each such entry or hash line can be further associated with a bucket of one or more page descriptors mapped to the single entry or hash line of the hash table. Thus each entry, hash line or bucket can correspond to a single index of the hash table1 HT1. A given logical address LA can be mapped, using the hash function F1, to a corresponding hash table1 (HT1) entry, index or bucket "j". It may be possible for multiple different LAs to map to the same HT1(j). In at least one embodiment each HT1(j) denoting a hash line, bucket, index or entry, can include all page descriptors of associated logical addresses which map to j using the hash function F1, where such page descriptors are stored in the mapping cache and associated with HT1(j). In at least one embodiment, each entry, index or bucket HT1(j) can include a linked list of pages descriptors having associated logical addresses which map to entry, index or bucket HT1(j). In at least one embodiment, each bucket HT1(j) can be a singly linked list of page descriptors having associated logical addresses which hash or map (using the hash function F1) to HT1(j).

In at least one embodiment as noted above, a miss with respect to the hash table1 HT1 of the mapping cache can occur if there is no corresponding page descriptor stored in the hash table1 HT1 for the target logical address, where the target logical address is mapped by the hash function F1 to the index, entry or bucket j of the hash table1 (e.g., HT1(j) does not include a page descriptor with a stored logical address matching the target logical address). Responsive to the miss with respect to the hash table1 HT1 of the mapping cache, processing can include: using the chain of mapping information to access the requested read data; and caching a corresponding new page descriptor in the mapping cache for the read I/O which triggered the read miss of HT1 of the mapping cache. Adding the new page descriptor to the mapping cache can include: obtaining a free or new page descriptor which is updated to include relevant corresponding information for the target logical address of the triggering read I/O; and adding the new descriptor to the hash tables HT1 and HT2. Adding the descriptor D1 to HT1 can include associating the page descriptor with the corresponding entry, index or bucket HT1(j) for the target logical address. HT2 can be accessed or indexed using a physical address P1 (of the descriptor D1) storing the content of the target logical address. The physical address P1 can be mapped by a hashing function F2 to a corresponding index or entry j2 of HT2, F2(P1)=j2, where a bucket or linked list associated with HT2(j2) includes the descriptor D1. Updating the page descriptor D1 for the target logical address as part of mapping cache miss processing for the read I/O can include updating the page descriptor to include: the physical location information, such as including an address, pointer or reference to the physical storage location including the content or user data stored at the target logical address; and to include the target logical address.

In at least one embodiment, a user data (UD) or client logical address, which can be the target logical address of a client I/O operation such as a read or write operation, can be uniquely identified using a volume or logical device ID (identifier) in combination with an LBA (logical block address) or offset.

In at least one embodiment, a promotion policy can be specified identifying conditions under which a new descriptor is added or promoted to the mapping cache and thus added to the hash tables HT1 and Ht2 of the mapping cache. In at least one embodiment, the promotion policy can specify multiple conditions or operations which trigger promotion and thus trigger adding a new descriptor to the hash tables HT1 and HT2 of the mapping cache, where the new descriptor is stored in the mapping cache. In at least one embodiment, the multiple operations triggering the promotion can include a read I/O operation, which requests content stored at a logical address), and where the read I/O operation results in a miss with respect to the hash table1 HT1 of the mapping cache (e.g., the hash table1 HT1 is determined not to include a descriptor corresponding to the logical address of the read I/O operation). As a result of the miss, miss processing can be performed which includes using a chain of mapping information to read the content requested by the read I/O operation from a physical location on non-volatile BE storage to service the read. A new descriptor can then be added to the hash tables HT1 and HT2 of the mapping cache, where the new descriptor is associated with a corresponding logical address mapped to the physical storage location of the content requested by the read I/O operation.

In at least one embodiment, the multiple operations triggering the promotion can include a flush operation which flushes a recorded or logged write I/O from the log, and where flushing includes writing content written by the flushed write I/O to a physical location on non-volatile BE storage. A new descriptor can be added to the hash tables HT1 and HT2 of the mapping cache, where the new descriptor is associated with a corresponding logical address mapped to the physical location of the content written by the flushed write I/O operation.

In at least one embodiment, the multiple operations can include garbage collection processing which relocates valid content C1 of a logical address LA1 from a source location P1 to a new or second target location P2. Responsive to relocating C1 by garbage collection processing, an existing descriptor D1 in the mapping cache can be invalid and therefore evicted from the mapping cache, and therefore evicted from the hash tables HT1 and HT2 used to manage the mapping cache. Optionally, a new descriptor can also be added to the mapping cache and structures thereof where the new descriptor corresponds to C1 of LA1 now stored at P2. Evicting D1 from the mapping cache as a result of relocating C1 as part of garbage collection processing can include using P1 to index into HT2 and obtain D1 which identifies LA1, where P1 is mapped to index k1 of HT2. Thus, HT2 can be used to identify the particular linked list or bucket associated with index k1 from which to remove D1 as part of evicting D1 from the mapping cache. HT2 can also be used to identify LA1. LA1 can then be used to index into HT1 where LA1 is mapped to index k2 of HT1, where k2 identifies the bucket or linked list of descriptors from which to delete D1 as part of evicting D1 from the mapping cache.

In at least one embodiment, a mapping cache hit in connection with a write I/O can trigger evicting a descriptor from the mapping cache and its structures. For example, a write I/O requesting to write content C1 to logical address LA1 can be an overwrite or update to LA1 where the write overwrites LA1's existing content with C1. In the case of a write I/O which overwrites LA1, the write can result in a mapping cache hit of HT1, where the hash table HT1 includes a descriptor D1 corresponding to LA1, and where write hit processing is performed. The physical location information of D1 can identify a physical storage location P1 which contains the old or existing content stored at LA1. As a result of the write I/O D1 becomes invalid and can be evicted from the mapping cache and hash tables HT1, HT2 thereof. In at least one embodiment, LA1 can be mapped to index k1 of HT1 thereby identifying the particular bucket or linked list associated with HT1(k1) from which the existing D1 is removed. Additionally, D1 identifies P1 where P1 can then be used as an index into HT2. In particular, P1 can be mapped to index k2 of HT2 thereby identifying the particular bucket or linked list associated with HT2(k2) from which the existing D1 is removed.

When adding a new descriptor to the mapping cache, a free or suitable in use descriptor can be selected. The new descriptor can be added as a result of an occurrence of a triggering operation or condition such as, for example, in connection with flushing a logged write I/O which includes storing or writing new content of a logical address to a physical location on BE non-volatile storage, or when accessing or reading content from a physical location on BE non-volatile storage. If an in use descriptor is selected such as may be the case where there is no free or unused descriptor, the in use descriptor can be selected by evicting the in use descriptor from the hash table of the mapping cache in accordance with a specified eviction policy. Subsequently, the evicted descriptor can be reused as the new descriptor. The new descriptor can be updated to include information relevant for the new content being stored on at a physical location on non-volatile BE storage. The new descriptor can be updated to include: physical location information identifying the physical location of the new content, and a corresponding logical address at which the new content is stored. The new descriptor can be added to an in use LRU (least recently used) queue and also added to both hash tables HT1 and HT2 of the mapping cache. Thus, in at least one embodiment, the mapping cache can cache in use descriptors and can be implemented using the hash tables HT1 and HT2 and one or more in use LRU queues. Each descriptor cached in the mapping cache can be associated with corresponding indices or entries of HT1 and HT2, and can be included in an in use LRU queue. Each of the hash tables HT1 and HT2 can include entries or indices each associated with a bucket or linked list of associated cached descriptors. The hash tables HT1 and HT2 can be used in connection with various work flows such as I/O workflows or processing. The in use LRU queue can be used in connection with management of the cached descriptors stored in the mapping cache such as in accordance with LRU based policies including an LRU based eviction policy.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN (s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
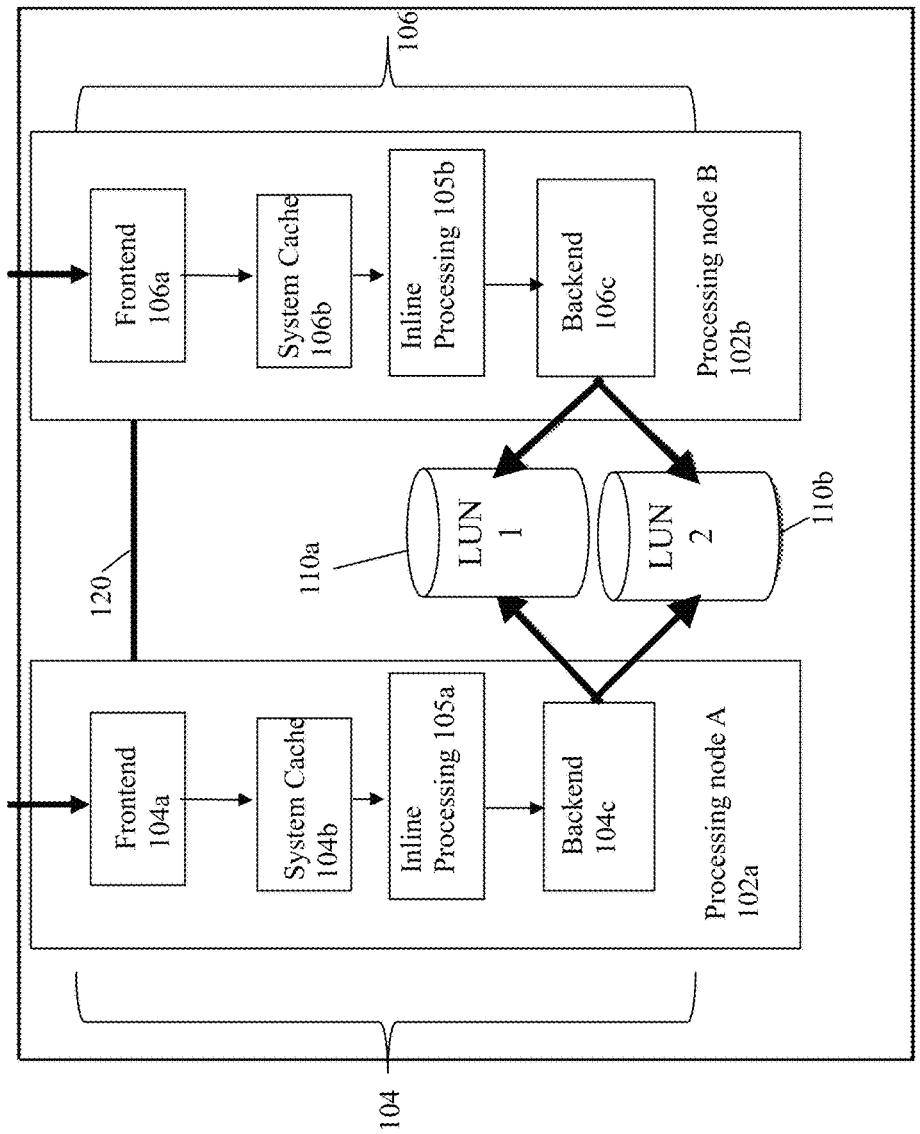
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110*a*, 110*b*), inline processing can be performed by layer 105*a*. Such inline processing operations of 105*a* can be optionally performed and can include any one of more data processing operations in connection with data that is flushed from system cache layer 104*b* to the back-end non-volatile physical storage 110*a*, 110*b*, as well as when retrieving data from the back-end non-volatile physical storage 110*a*, 110*b* to be stored in the system cache layer 104*b*. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102*b* has its own FE component 106*a*, system cache layer 106*b*, inline processing layer 105*b*, and BE component 106*c* that are respectively similar to the components 104*a*, 104*b*, 105*a* and 104*c*. The elements 110*a*, 110*b* denote the non-volatile BE physical storage provisioned from PDs for the LUNs, whereby an I/O can be directed to a location or logical address of a LUN and where data can be read from, or written to, the logical address. The LUNs 110*a*, 110*b* are examples of storage objects representing logical storage entities included in an existing data storage system configuration. Since, in this example, writes, or more generally I/Os, directed to the LUNs 110*a*, 110*b* can be received for processing by either of the nodes 102*a* and 102*b*, the example 100 illustrates what can also be referred to as an active-active configuration.

In connection with a write operation received from a host and processed by the processing node A 102*a*, the write data can be written to the system cache 104*b*, marked as write pending (WP) denoting it needs to be written to the physical storage 110*a*, 110*b* and, at a later point in time, the write data can be destaged or flushed from the system cache to the physical storage 110*a*, 110*b* by the BE component 104*c*. The write request can be considered complete once the write data has been stored in the system cache whereby an acknowledgement regarding the completion can be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2A is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105*a*, 105*b* as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102*a-b* in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
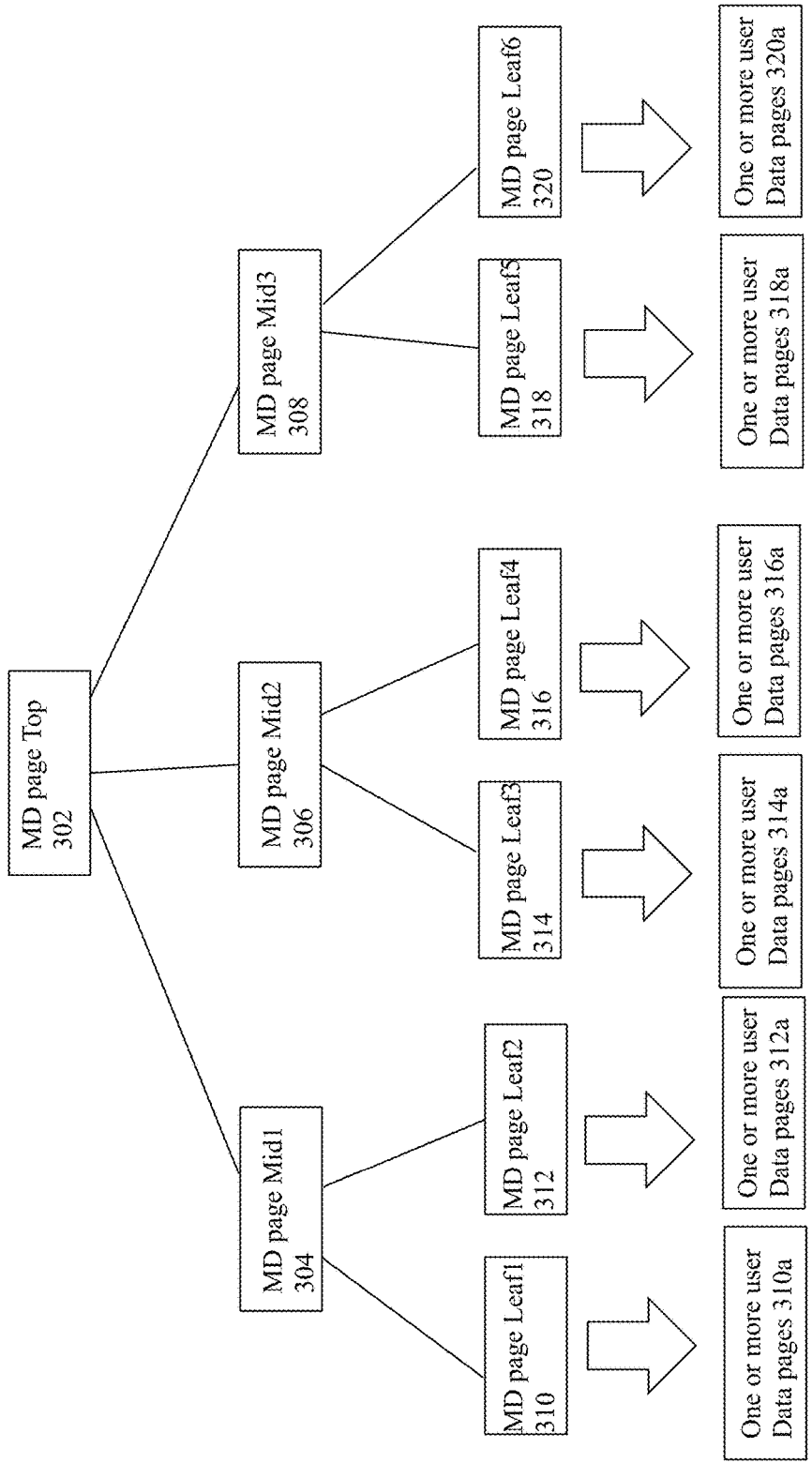
FIGS. 3, 4, 5, and 6A are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
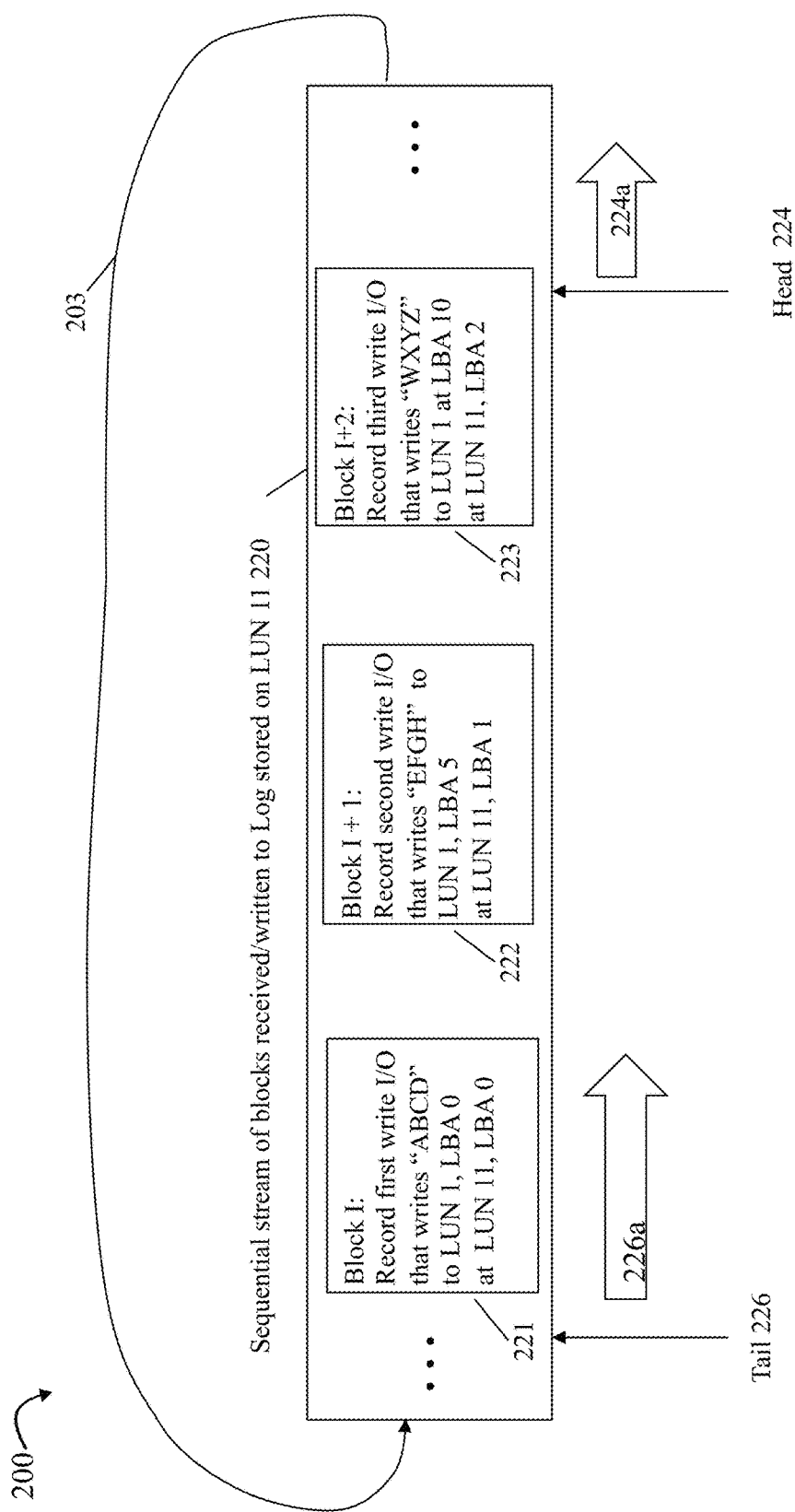
FIGS. 2B, 2C, 2D and 2D are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
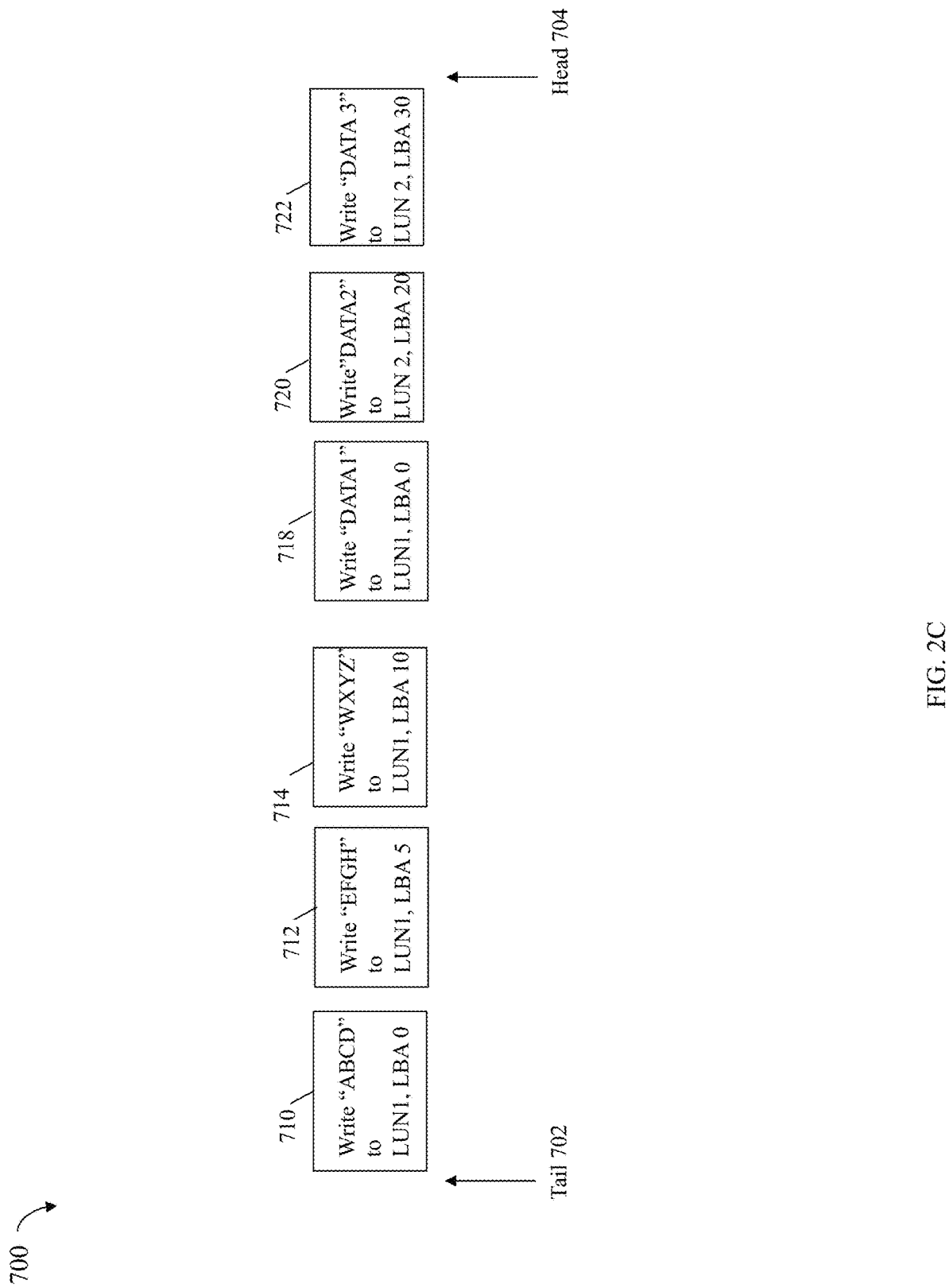

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
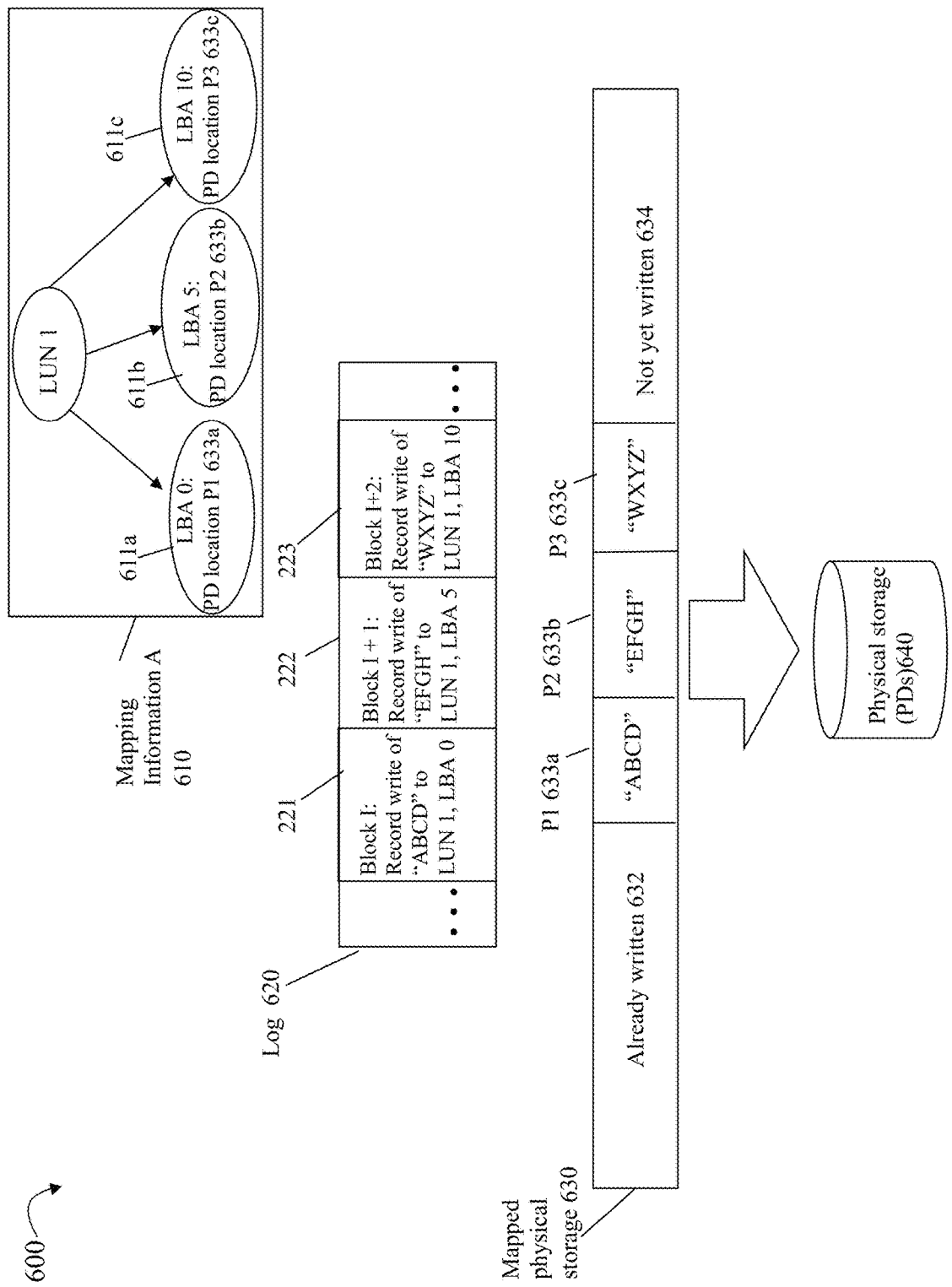

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640. The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log with a layout which is sequential in the order it is written to the log.

The data layout of the flushed log data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630. In at least one embodiment, modifications to metadata including mapping information used by the data storage system can also be recorded in the log 620 and flushed to the mapped physical storage 630, and thus the BE PDs 640, in a manner similar to that as described herein for the written user data which can include data written by host-based writes.

Consistent with other discussion herein, the mapped physical storage 630 can correspond to the BE PDs providing BE non-volatile storage used for persistently storing user data as well as metadata, such as the mapping information. With a log structured system as discussed herein, as recorded writes in the log are processed, the data written by the writes can be written to new sequential physical storage locations on the BE PDs. Thus, with a log structured system, the data and associated metadata can be written sequentially to the log 620 and also can be written sequentially to the mapped physical storage 630. Thus, one characteristic of log structured systems (LSSs) is that updates do not overwrite the existing copy, such as of user data written by a write operation. Rather, the updated or new data written at a target logical address can be stored at a next sequential location in the log and also in a next sequential physical storage location on the BE PDs. In an LSS of the data storage system in at least one embodiment, the physical storage 630 denoting the physical storage of the BE PDs can also be implemented and managed as a logical circular log in a manner similar to that as described above in connection with the log of FIGS. 2B, 2C and 2D containing the data prior to being flushed to the physical storage 630 of the BE PDs.

In data storage systems implementing an LSS such as described here, garbage collection can be performed by the data storage system at various times in an embodiment. Garbage collection processing can be performed by the data storage system on the BE PDs to aggregate allocated stored data blocks with valid data to eliminate free unused physical storage locations (e.g., which can store invalid or stale content of overwritten logical addresses) that can be interspersed between the data blocks containing valid data. Such aggregation can include physically copying or moving data blocks of valid user data stored at various physical locations on BE non-volatile storage into a single larger physical storage location. From the perspective of the data storage system, valid data can include the current or most recent copy of client-based write data such as host-based write data (e.g., written by write I/Os received from one or more hosts), as well as the current or most recent copy of flushed metadata, such as the mapping information used by the data storage system to locate a current copy of content associated with a logical address such as, for example, of a read or write I/O operation. After the valid data blocks are relocated from their source locations on multiple source blocks to target locations of a target block, the source blocks can denote larger contiguous chunks of storage which are free and available for reuse. Having such a larger contiguous chunk of free storage facilitates efficiently fulfilling subsequent allocation requests for free BE PD capacity from different components for different uses. Such subsequent allocation requests can include, for example, requests for storing data that is flushed from the log as well as other requests for larger amounts of storage.

A specified size or chunk of physical storage of the BE PDs can be referred to as a physical large block or PLB. In at least one embodiment, garbage collection can be performed on physical storage units that are PLBs. In at least one embodiment, each PLB can be 2 MBs in size. Within a single PLB, the valid data and the holes (e.g., containing invalid data or designated as an unused portion) can be interspersed since, for example, write granularity size units can be 4K chunks or blocks.

In a data storage system implementing an LSS, garbage collection (sometimes denoted herein as GC) can be performed by the data storage system in a continuous manner to manage its BE PDs and reclaim physical storage of holes including unused storage or storage with invalid data. The GC results in performing additional overhead operations such as additional read and write operations in connection with reading valid data from the multiple source PLBs and aggregating and writing the valid data of the multiple source PLBs to a single target PLB. In this manner, the source PLBs can be freed and made available for reuse. In a data storage system or DS which implements an LSS, such as described above for storing writes or updates to user data, the DS itself can perform GC as needed to obtain free contiguous chunks of storage such as non-volatile storage on the BE PDs. The GC performed by the DS can be done as a maintenance or background task as user logical addresses are overwritten or updated with multiple writes to the same logical address. In this case, the DS can perform GC to reclaim and reuse the storage which contains old or invalid content that is replaced or updated with new content in the LSS. Consistent with other discussion herein, both valid content and invalid content can be stored within a first large contiguous chunk of storage whereby the DS can perform GC to move the valid content to a second chunk in order to free all storage within the first chunk. Such GC as performed by the DS results in write amplification denoting the extra or additional writes performed in connection with copying or moving valid content in order to obtain the contiguous free chunk of storage.

In at least one embodiment, each PLB can be further partitioned into smaller units of storage such as multiple data pages. For example in at least one embodiment, each PLB can be 2 MB in size where the PLB can be further partitioned into 4K byte pages.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Figure 2E:
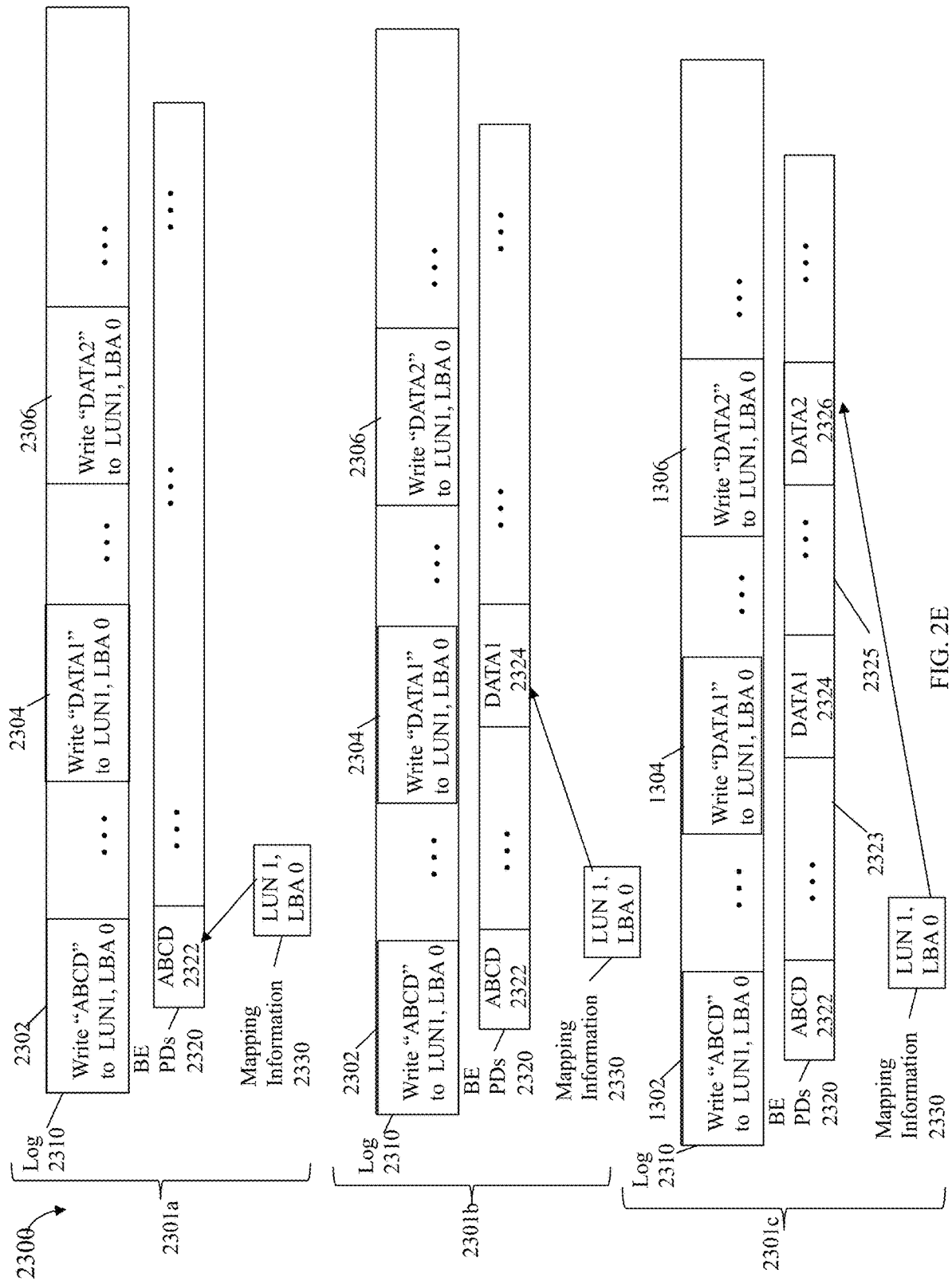

For example with reference to FIG. 2E, the element 2301*a* can denote the state of the log file 2310, BE PDs 2320 and mapping information 2330 at a first point in time T1 after processing the record 2302 for a first write of "ABCD" to the logical address LUN A, LBA 0. The data written "ABCD" by the recorded write of 2302 can be stored at the BE PD location 2322. Thus, flushing the log record 2302 results in storing the write data "ABCD" to the BE PD location 2322 and additionally updating the mapping information 2330 to reference the BE PD location 2322. The mapping information 2330 denotes the metadata used to map the logical address LUN 1, LBA 0 to the current physical location on the BE PDs containing the user data or content stored at the logical address LUN 1, LBA 0. After the log record 2302 is flushed from the log 2310, the record 2302 is available and can be subsequently reclaimed for reuse for logging other operations in the log 2310.

At a second point in time T2 subsequent to T1, the log record 2304 can be processed and flushed to the BE PDs 2320. The element 2301b denotes the state of the log file 1310, BE PDs 1320 and mapping information 1330 at the second point in time T2 after processing the record 1304 for a second write of "DATA1" to the logical address LUN A, LBA 0. The data written "DATA1" by the recorded write of 1304 can be stored at the BE PD location 1324. Thus, flushing the log record 1304 results in storing the write data "DATA1" to the BE PD location 1324 and additionally updating the mapping information 1330 to reference the BE PD location 1324 denoting the physical location containing the data stored at the LUN 1, LBA 0 at the time T2. Additionally, the PD location 1322 can be invalidated since it no longer contains valid current data for the logical address LUN 1, LBA 0, whereby the PD location 1322 can be available for reuse. After the log record 1304 is flushed from the log 1310, the record 1304 is available and can be subsequently reclaimed for reuse for logging other operations in the log 1310.

At a third point in time T3 subsequent to T2, the log record 2306 can be processed and flushed to the BE PDs 2320. The element 2301c denotes the state of the log file 2310, BE PDs 2320 and mapping information 2330 at the third point in time T3 after processing the record 2306 for a third write of "DATA2" to the logical address LUN A, LBA 0. The data written "DATA2" by the recorded write of 2306 can be stored at the BE PD location 2326. Thus, flushing the log record 2306 results in storing the write data "DATA2" to the BE PD location 2326 and additionally updating the mapping information 2330 to reference the BE PD location 2326 denoting the physical location containing the data stored at the LUN 1, LBA 0 at the time T3. Additionally, the PD location 2324 can be invalidated since it no longer contains valid current data for the logical address LUN 1, LBA 0, whereby the PD location 2324 can be available for reuse. After the log record 2306 is flushed from the log 2310, the record 2306 is available and can be subsequently reclaimed for reuse for logging other operations in the log 2310.

As illustrated by the elements 2301a-c, over time, the physical storage locations 2322, 2324 of the BE PDs 2320 become free and available for reuse. The other physical storage locations 2323, 2325 and 2326 can still contain valid data. Thus, the free, available reusable physical storage locations 2322, 2324 can form holes or segments interspersed among the other portions 2323, 2325, 2326 containing valid data. More generally, the size of the holes 2322, 2324 can be of varying sizes and can include multiple user data blocks or pages. Additionally, portions of physical storage of the BE PDs can also be similarly allocated and then freed for reuse for other purposes. Thus, the holes of free, reusable physical storage as well other portions of physical storage including valid data can result not only from flushing the log file but also from other purposes that can vary with embodiment.

As noted above, in a data storage system implementing an LSS, GC can be performed by the data storage system at various times in an embodiment. For example, GC can relocate and aggregate valid data from multiple source blocks, such as 2323, 2325 and 2326 at the time T3, to a single destination or target block. After such relocation and aggregation by GC, the storage locations 2322, 2323, 2324, 2325 and 2326 denote a larger contiguous chunk of storage that is free and available for reuse. Having such a larger contiguous chunk of free storage facilitates efficiently fulfilling subsequent allocation requests for free BE PD capacity from different components for different uses. Such subsequent allocation requests can include, for example, requests for storing data that is flushed from the log as well as other requests for larger amounts of storage.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310a, 312a, 314a, 316a, 318a and 320a.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312a. In order to access UD page X of 312a, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310*a*, 312*a*, 314*a*, 316*a*, 318*a* and 320*a* include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310*a*, 312*a*, 314*a*, 316*a*, 318*a* and 320 each include user data stored on particular logical addresses of the LUN A's logical address space. It may be, for example, that element 310*a* includes user data stored at a first set of LBAs 0-511; and that element 312*a* includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310*a* denotes data pages for LBAs 0-511; the element 312*a* denotes data pages for the LBAs 512-1023; the element 314*a* denotes data pages for LBAs 1024-1535; the element 316*a* denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310*a* denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310*a*.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
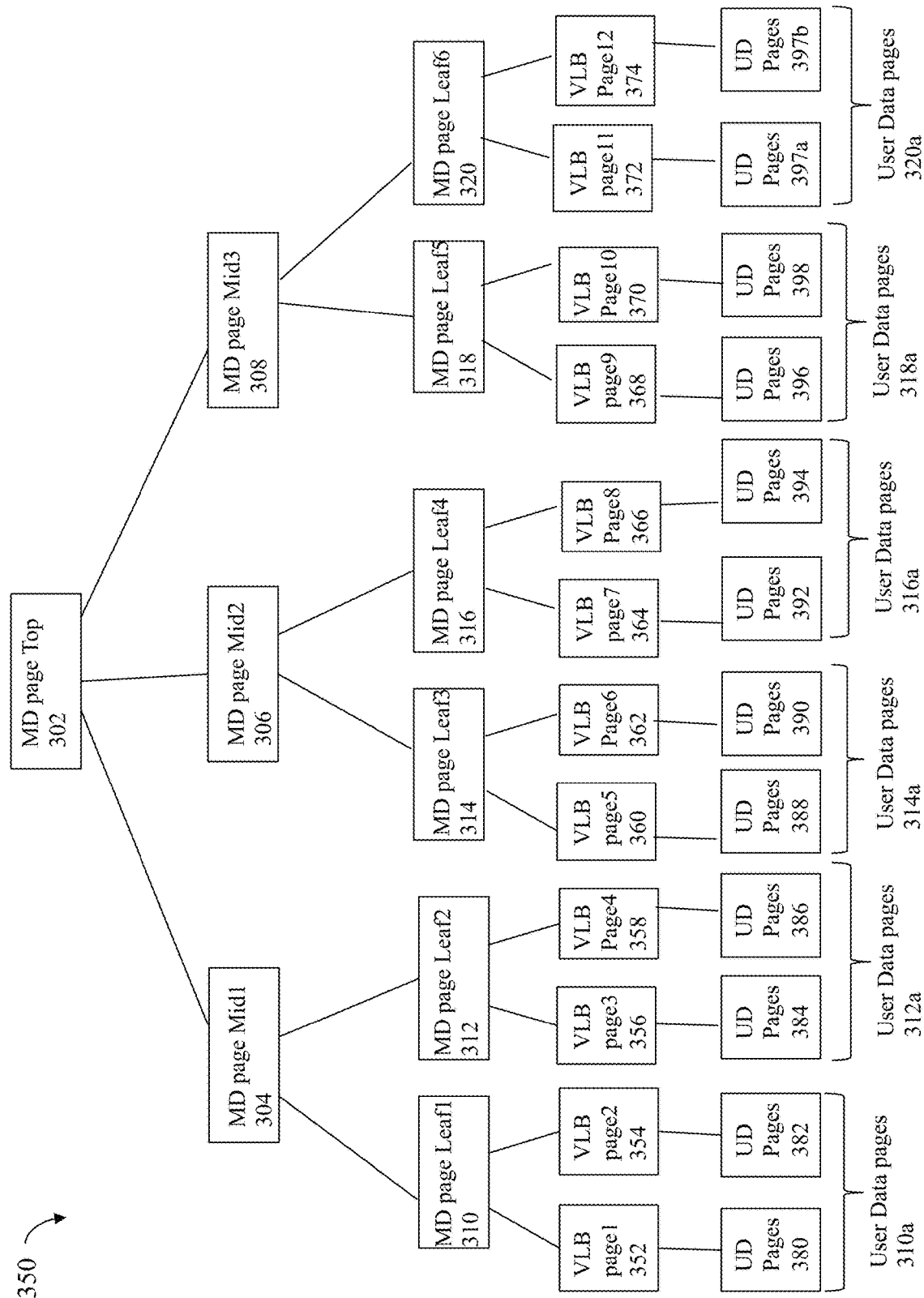

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310*a* of FIG. 3 including data for LBAs 0-511. The UD pages 384 and 386 denote two portions of UD pages corresponding to UD pages 312*a* of FIG. 3 including data for LBAs 512-1023. The UD pages 388 and 390 denote two portions of UD pages corresponding to UD pages 314*a* of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
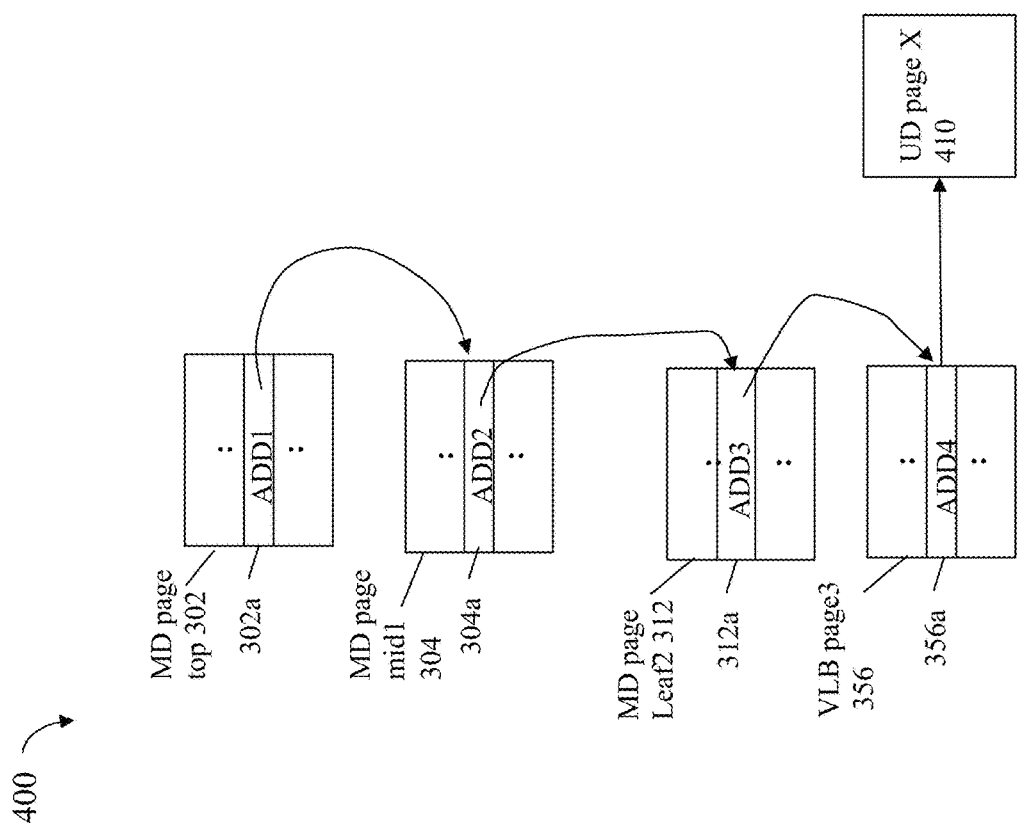

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the location 304a in the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the entry 304a of the particular mid level MD page, such as MD page mid1 304, that is accessed next in the sequence.

Continuing with the example 400, the MD page mid1 304 can be accessed where the location 304a is read to obtain the address or pointer ADD2 from location 304a. The address or pointer ADD2 can then be used to identify the entry 312a of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies location 312a of the MD page leaf 2 312. If the MD page 312 is not already in cache, the on-disk copy of the MD page 312 on a PD can be read to obtain the content of location 312a. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6A:
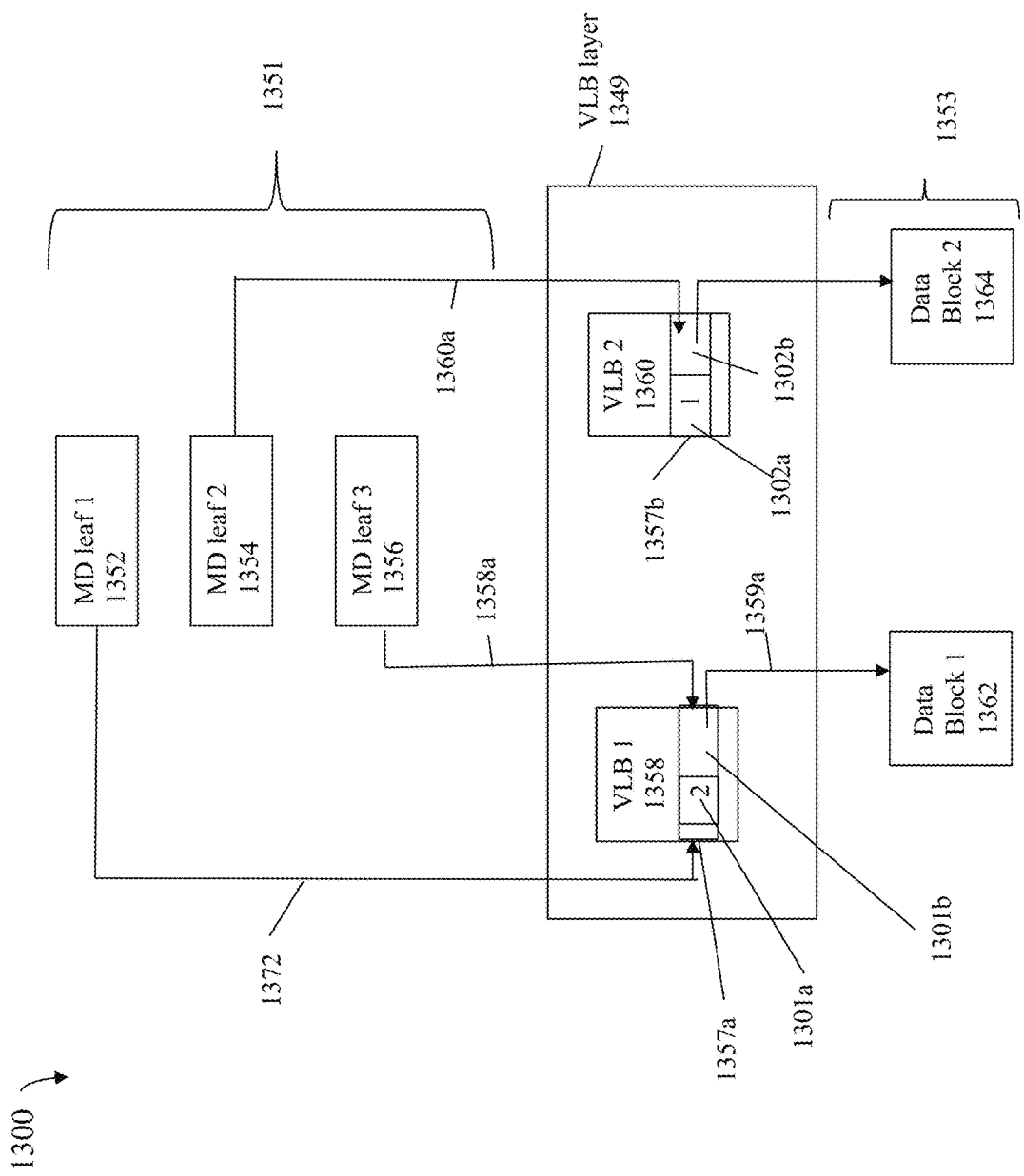

Referring to FIG. 6A, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include the fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301*b*).

The element 1360*a* denotes a pointer to, or address of, the entry 1357*b* in the VLB 1360 used in connection with obtaining the data block 1364 stored on a particular LUN and LBA of the LUN. The pointer 1360*a* can be used as the virtual or indirect pointer in connection with obtaining the data block 1364. Thus, in such an embodiment, the virtual or indirect pointer 1360*a* can be a pointer to the entry 1357*b* of the VLB structure 1360, where the entry 1357*b* can further include the fields 1302*a* and 1302*b*. The field 1302*b* can be a pointer to, or address of, the user data block 1364. The field 1302*a* can be a reference count or counter indicating the number of instances of, or references to, the particular data block 1362 (e.g., data block pointed to by 1302*b*).

The reference count 1301*a* can be initialized to 1 when a first or initial instance of the associated data block 1362 is stored. In this example, the reference 1301*a* is 2 indicating that there are 2 instances of the data block 1362 and thus 2 references to the data block 1362. In this case, the are 2 instances of the data block 1362 in stored user data. The instances denoted by the reference count 1301*a* include all deduplicated instances corresponding to entries of the MDL leaves 1352, 1356 that respectively point 1372, 1358*a* to the VLB entry 1357*a* associated with the single copy of the data block 1362.

The reference count 1302*a* can be initialized to 1 when a first or initial instance of the associated data block 1364 is stored. In this example, the reference 1302*a* is 1 indicating that there is 1 instance of the data block 1364 and thus 1 reference to the data block 1364. The instances denoted by the reference count 1302*a* generally include any/all deduplicated instances associated with the single copy of the data block 1364. However, in this example, there is only a single reference to, and single instance of, the data block 1364 in stored user data. In particular, the MD leaf 1354 references or points (1360*a*) to the VLB entry 1357*b* associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6A.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6A.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6A.

In at least one embodiment, updates or modifications to the MD pages of the MD or mapping structure described in connection with the FIGS. 3-6A can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6A can be persistently stored in a MD page store on the BE PDs of the system. In some contexts herein, the copy of a MD page as stored in the MD page store on the BE PDs can also be referred to herein as the on-disk copy of the MD page.

As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs. Thus, the BE PDs can retain the valid old data in the original physical location for some time before being reclaimed for reuse by garbage collection processing.

Consistent with other discussion herein, an entry from the log of user or client updates (sometimes referred to as the UD (user data) log) can be an update to a logical address (e.g., LUN and LBA) which writes content to a UD page. Flushing the entry can include destaging the updated UD page to a backend storage location on non-volatile storage (e.g., BE PD location). Additionally, flushing and destaging the entry from the log can include updating the corresponding MD pages which map the logical address to its corresponding BE PD location including the content stored at the logical address. In at least one existing system, the mapping information including MD pages as described herein can thus be updated. For example, such updating of the mapping information can include updating any of the top, mid and leaf MD pages used in connection with mapping the logical address to the BE PD location including the content stored at the logical address. In at least one existing implementation, updating the corresponding mapping information and MD pages can include loading all the MD pages into the cache if any such MD pages are not already in cache. The MD pages of the mapping information can be characterized as a chain forming an access sequence of top MD page, mid MD page, and leaf MD page.

Described in the present disclosure are techniques that use a mapping cache of page descriptors. In at least one embodiment the mapping cache can be implemented using structures including two hash tables. In at least one embodiment, each cached page descriptor (sometimes simply referred to herein as descriptor) can be included in both of the two hash tables. A first hash table1 HT1 of the mapping cache can be maintained with the key being a logical address which is mapped to a corresponding page descriptor (sometimes simply referred to herein as descriptor), where the descriptor includes a physical address or physical location information of content stored at the logical address. A second hash table2 HT2 of the mapping cache can be maintained with the key being the physical address or physical location information which is mapped to a corresponding descriptor, where the descriptor also includes the logical address having its content stored at the physical address or physical address location used to index into HT2. Thus, the same cached descriptor can be included in both HT1 and HT2 of the mapping cache. Each cached page descriptor can include a logical address and can also include physical location information, such as an address, pointer or reference to the physical location containing the current or up-to-date content stored at the logical address (of the descriptor). In at least one embodiment, the size of descriptors stored in the mapping cache can generally be much smaller than the actual content or user data (as may be stored using a traditional data cache). In at least one embodiment, the mapping cache can be used and implemented rather than a traditional data cache of user data which is organized using logical addresses as keys and which provides for returning content stored at a particular logical address. In at least one embodiment, the mapping cache can be implemented rather than maintain and implement the data cache to cache frequently accessed content or user data. Generally, for a specified number of logical addresses, the amount of cache consumed to store corresponding descriptors for the logical addresses is expected to be much less than the amount of cache consumed to store the actual content or user data stored at the logical addresses. Thus it can be expected that a much larger number of descriptors can be stored in an amount of cache as compared to the number of logical addresses whose content can be stored in the same amount of cache.

In at least one embodiment, read I/O processing which reads data from a target logical address can include querying the first hash table1 HT1 of the mapping cache. A lookup of the hash table1 HT1 can be performed using the target logical address as the key. A hash function F1 can be used which maps the target logical address LA to an entry or index j of the hash table1 HT1 (e.g., F1(LA)=HT1(j)). If the mapped entry or index HT1(j) does include a corresponding page descriptor for the target logical address, a hit occurs with respect to the mapping cache and thus hash table 1 HT1 thereof. Alternatively, if the mapped entry or index HT1(j) does not include a corresponding page descriptor for the target logical address, a miss occurs with respect to the mapping cache and thus hash table1 HT1 thereof. Responsive to the hit with respect to the hash table1 HT1 of the mapping cache, the corresponding page descriptor as stored in, or associated with, HT1(j) of the mapping cache can be used to access the requested read data stored at the target logical address. In at least one embodiment, the page descriptor can include the target logical address; and also physical location information such as a pointer, address or reference to the physical storage location containing the requested read data stored at the target logical address. Thus, processing the read I/O responsive to the hit with respect to the hash table1 (e.g., HT1(j)) of the mapping cache can include reading the requested read data using the pointer, address or reference to the physical storage location of the page descriptor returned by the query or lookup in the hash table1 HT1. In at least one embodiment, the hash table1 HT1 can include "N" entries or hash lines, where each such entry or hash line can be further associated with a bucket of one or more page descriptors mapped to the single entry or hash line of the hash table. Thus each entry, hash line or bucket can correspond to a single index of the hash table1 HT1. A given logical address LA can be mapped, using the hash function F1, to a corresponding hash table1 (HT1) entry, index or bucket "j". It may be possible for multiple different LAs to map to the same HT1(j). In at least one embodiment each HT1(j) denoting a hash line, bucket, index or entry, can include all page descriptors of associated logical addresses which map to j using the hash function F1, where such page descriptors are stored in the mapping cache and associated with HT1(j). In at least one embodiment, each entry, index or bucket HT1(j) can include a linked list of pages descriptors having associated logical addresses which map to entry, index or bucket HT1(j). In at least one embodiment, each bucket HT1(j) can be a singly linked list of page descriptors having associated logical addresses which hash or map (using the hash function F1) to HT1(j).

In at least one embodiment as noted above, a miss with respect to the hash table1 HT1 of the mapping cache can occur if there is no corresponding page descriptor stored in the hash table1 HT1 for the target logical address, where the target logical address is mapped by the hash function F1 to the index, entry or bucket j of the hash table1 (e.g., HT1(j) does not include a page descriptor with a stored logical address matching the target logical address). Responsive to the miss with respect to the hash table1 HT1 of the mapping cache, processing can include: using the chain of mapping information to access the requested read data; and caching a corresponding new page descriptor in the mapping cache for the read I/O which triggered the read miss of HT1 of the mapping cache. Adding the new page descriptor to the mapping cache can include: obtaining a free or new page descriptor which is updated to include relevant corresponding information for the target logical address of the triggering read I/O; and adding the new descriptor to the hash tables HT1 and HT2. Adding the descriptor D1 to HT1 can include associating the page descriptor with the corresponding entry, index or bucket HT1(j) for the target logical address. HT2 can be accessed or indexed using a physical address P1 (of the descriptor D1) storing the content of the target logical address. The physical address P1 can be mapped by a hashing function F2 to a corresponding index or entry j2 of HT2, F2(P1)=j2, where a bucket or linked list associated with HT2(j2) includes the descriptor D1. Updating the page descriptor D1 for the target logical address as part of mapping cache miss processing for the read I/O can include updating the page descriptor to include: the physical location information, such as including an address, pointer or reference to the physical storage location including the content or user data stored at the target logical address; and to include the target logical address.

In at least one embodiment, a user data (UD) or client logical address, which can be the target logical address of a client I/O operation such as a read or write operation, can be uniquely identified using a volume or logical device ID (identifier) in combination with an LBA (logical block address) or offset.

In at least one embodiment, a promotion policy can be specified identifying conditions under which a new descriptor is added or promoted to the mapping cache and thus added to the hash tables HT1 and Ht2 of the mapping cache. In at least one embodiment, the promotion policy can specify multiple conditions or operations which trigger promotion and thus trigger adding a new descriptor to the hash tables HT1 and HT2 of the mapping cache, where the new descriptor is stored in the mapping cache. In at least one embodiment, the multiple operations triggering the promotion can include a read I/O operation, which requests content stored at a logical address), and where the read I/O operation results in a miss with respect to the hash table1 HT1 of the mapping cache (e.g., the hash table1 HT1 is determined not to include a descriptor corresponding to the logical address of the read I/O operation). As a result of the miss, miss processing can be performed which includes using a chain of mapping information to read the content requested by the read I/O operation from a physical location on non-volatile BE storage to service the read. A new descriptor can then be added to the hash tables HT1 and HT2 of the mapping cache, where the new descriptor is associated with a corresponding logical address mapped to the physical storage location of the content requested by the read I/O operation.

In at least one embodiment, the multiple operations triggering the promotion can include a flush operation which flushes a recorded or logged write I/O from the log, and where flushing includes writing content written by the flushed write I/O to a physical location on non-volatile BE storage. A new descriptor can be added to the hash tables HT1 and HT2 of the mapping cache, where the new descriptor is associated with a corresponding logical address mapped to the physical location of the content written by the flushed write I/O operation.

In at least one embodiment, the multiple operations can include garbage collection processing which relocates valid content C1 of a logical address LA1 from a source location P1 to a new or second target location P2. Responsive to relocating C1 by garbage collection processing, an existing descriptor D1 in the mapping cache can be invalid and therefore evicted from the mapping cache, and therefore evicted from the hash tables HT1 and HT2 used to manage the mapping cache. Optionally, a new descriptor can also be added to the mapping cache and structures thereof where the new descriptor corresponds to C1 of LA1 now stored at P2. Evicting D1 from the mapping cache as a result of relocating C1 as part of garbage collection processing can include using P1 to index into HT2 and obtain D1 which identifies LA1, where P1 is mapped to index k1 of HT2. Thus, HT2 can be used to identify the particular linked list or bucket associated with index k1 from which to remove D1 as part of evicting D1 from the mapping cache. HT2 can also be used to identify LA1. LA1 can then be used to index into HT1 where LA1 is mapped to index k2 of HT1, where k2 identifies the bucket or linked list of descriptors from which to delete D1 as part of evicting D1 from the mapping cache.

In at least one embodiment, a mapping cache hit in connection with a write I/O can trigger evicting a descriptor from the mapping cache and its structures. For example, a write I/O requesting to write content C1 to logical address LA1 can be an overwrite or update to LA1 where the write overwrites LA1's existing content with C1. In the case of a write I/O which overwrites LA1, the write can result in a mapping cache hit of HT1, where the hash table HT1 includes a descriptor D1 corresponding to LA1, and where write hit processing is performed. The physical location information of D1 can identify a physical storage location P1 which contains the old or existing content stored at LA1. As a result of the write I/O D1 becomes invalid and can be evicted from the mapping cache and hash tables HT1, HT2 thereof. In at least one embodiment, LA1 can be mapped to index k1 of HT1 thereby identifying the particular bucket or linked list associated with HT1(k1) from which the existing D1 is removed. Additionally, D1 identifies P1 where P1 can then be used as an index into HT2. In particular, P1 can be mapped to index k2 of HT2 thereby identifying the particular bucket or linked list associated with HT2(k2) from which the existing D1 is removed.

When adding a new descriptor to the mapping cache, a free or suitable in use descriptor can be selected. The new descriptor can be added as a result of an occurrence of a triggering operation or condition such as, for example, in connection with flushing a logged write I/O which includes storing or writing new content of a logical address to a physical location on BE non-volatile storage, or when accessing or reading content from a physical location on BE non-volatile storage. If an in use descriptor is selected such as may be the case where there is no free or unused descriptor, the in use descriptor can be selected by evicting the in use descriptor from the hash table of the mapping cache in accordance with a specified eviction policy. Subsequently, the evicted descriptor can be reused as the new descriptor. The new descriptor can be updated to include information relevant for the new content being stored on at a physical location on non-volatile BE storage. The new descriptor can be updated to include: physical location information identifying the physical location of the new content, and a corresponding logical address at which the new content is stored. The new descriptor can be added to an in use LRU (least recently used) queue and also added to both hash tables HT1 and HT2 of the mapping cache. Thus, in at least one embodiment, the mapping cache can cache in use descriptors and can be implemented using the hash tables HT1 and HT2 and one or more in use LRU queues. Each descriptor cached in the mapping cache can be associated with corresponding indices or entries of HT1 and HT2, and can be included in an in use LRU queue. Each of the hash tables HT1 and HT2 can include entries or indices each associated with a bucket or linked list of associated cached descriptors. The hash tables HT1 and HT2 can be used in connection with various work flows such as I/O workflows or processing. The in use LRU queue can be used in connection with management of the cached descriptors stored in the mapping cache such as in accordance with LRU based policies including an LRU based eviction policy.

The foregoing and other aspects of the techniques of the present disclosure are described in more detail in the following paragraphs.

Figure 6B:
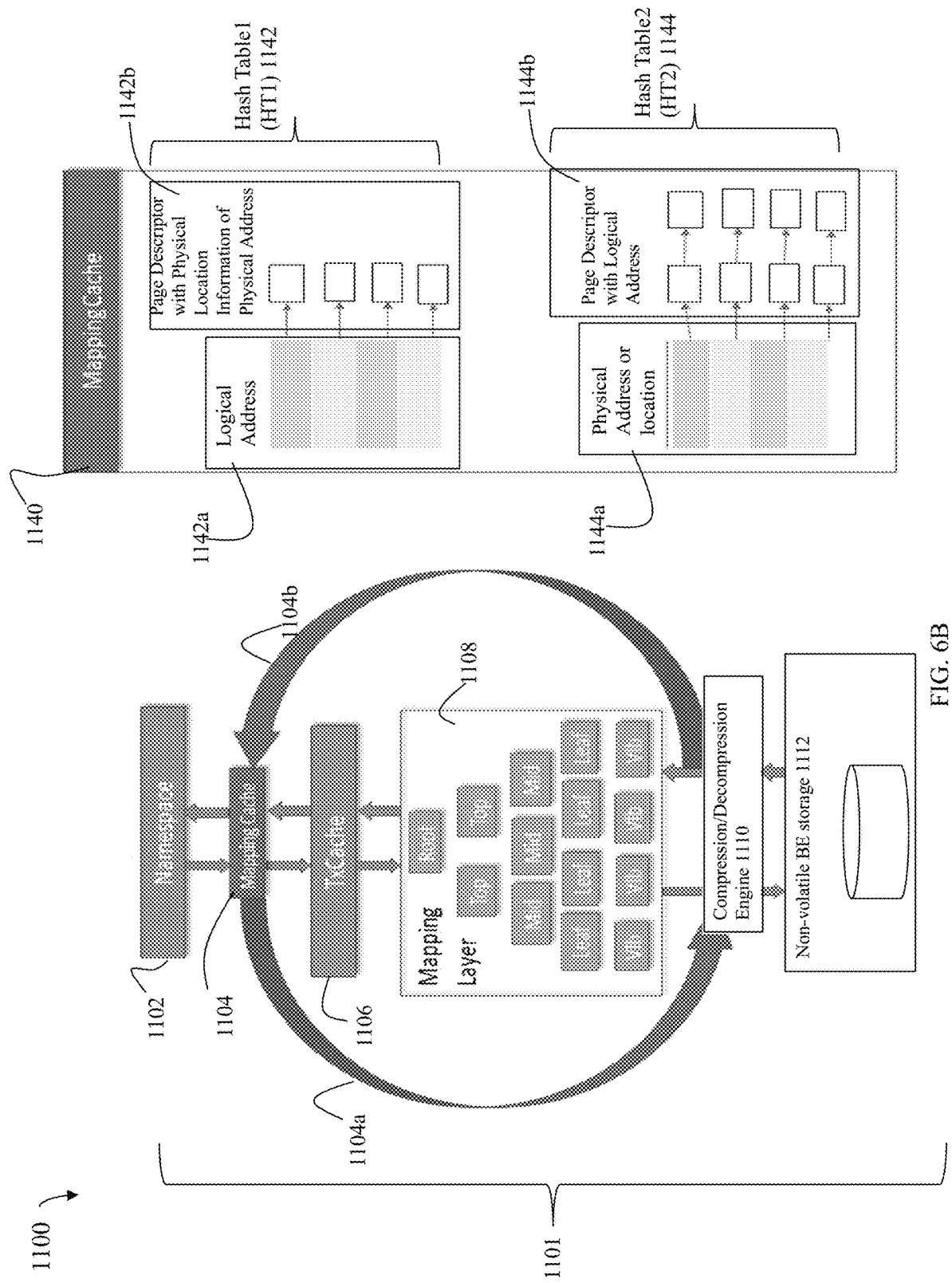
FIG. 6B is an example of components and associated data flow in at least one embodiment in accordance with the techniques of the present disclosure.

Referring to FIG. 6B, shown is an example 1100 of components and associated data flow in at least one embodiment in accordance with the techniques of the present disclosure.

Element 1101 illustrates various layers and components in connection with data flow when servicing I/Os in at least one embodiment in accordance with the techniques of the present disclosure. Element 1101 includes a namespace 1102 denoting a user data logical address space of storage clients, a mapping cache 1104, a transaction (Tx) cache 1106, a mapping layer 1108, a compression/decompression engine or layer 1110, and non-volatile BE storage 1112. The Tx cache 1106 and the mapping cache 1108 denote caching layers. Element 1140 provides further details regarding the mapping cache 1104 in at least one embodiment.

The namespace 1102 can include, for example, logical addresses of volumes or LUNs storing client content. Consistent with other discussion herein, the logical addresses can be expressed using a volume or LUN identifier and LBA or offset. A logical address of the namespace 1102 can be included, for example, in read I/O operations and write I/O operations issued by storage clients to a data storage system. In at least one embodiment, the storage clients can include external storage clients which are external with respect to the data storage system. In at least one embodiment, the storage clients can include one or more hosts such as described elsewhere herein (e.g., FIG. 1).

The mapping layer 1108 can denote the mapping information including a hierarchy of metadata include MD pages and VLB pages described elsewhere herein, (e.g., FIGS. 2D-E, 3, 4, 5 and 6A). Consistent with other discussion herein, the mapping information of the mapping layer 1108 can include mapping information of chains of MD pages which map logical addresses to corresponding physical storage addresses or locations on the non-volatile BE storage 1112, where such physical storage addresses or locations contain data or content stored at corresponding mapped logical addresses. In at least one embodiment, the various pages of the mapping layer 1108 can be persistently stored on non-volatile storage with frequently accessed pages also maintained in the in-memory Tx cache 1106. The Tx cache 1106 can also be used to store other information such as, for example, an in-memory copy of portions of a metadata log of changes or updates to metadata of the mapping layer 1108.

The compression/decompression engine 1110 can be used to compress and decompress content, respectively, written to and from non-volatile BE storage 1112.

The mapping cache 1104 is a layer which can be used in embodiments in accordance with the techniques of the present disclosure to by-pass other layers of the illustrated data flow in connection with I/O flows for read and write I/Os. The mapping cache 1104 includes cached page descriptors (sometimes referred to as descriptors) which in at least one embodiment are stored in a form of volatile fast memory, such as a form of RAM memory. The descriptors of the mapping cache 1104 can be implemented using structures include a first hash table 1 HT1 1142 and a second hash table 2 HT2 1144. Using HT1 1142, the descriptors can be indexed, accessed and organized using keys which are logical addresses (e.g., volume or LUN ID and LBA or offset) and where the cached content or values are the cached page descriptors for corresponding logical addresses. Using HT1 1142, processing can map a logical address to a corresponding descriptor, if such descriptor is stored in the mapping cache 1104. In at least one embodiment as illustrated by element 1140, the mapping cache can be implemented using a hash table HT1 1142 with entries or indices. A logical address 1142*a* can be mapped, such as using a hash function F, to an entry or index j of the hash table1 HT1 1142, denoted as HT(j), where HT(j) is associated with or includes one or more page descriptors 1142*b* each with a corresponding logical address mapped by F to HT(j). Each of the cached page descriptors 1142*b* can include multiple fields of information related to the mapped logical address. One of the fields of information of each cached page descriptor 1142*b* is physical location information of a physical address or storage location on the non-volatile BE storage 1112 containing content stored at a corresponding logical address 1142*a*. Thus the mapping cache 1104, 1140 does not store the actual content or data of a corresponding logical address 1142*a* but rather stores a descriptor 1142*b* which further includes the physical address or location of content stored at the corresponding logical address. In this manner in at least one embodiment, the descriptor 1142*b* can be used to directly access the actual content or data of a corresponding logical address 1142*a* bypassing other layers, such as bypassing the mapping layer 1108. In at least one embodiment, when a read I/O requesting to read content stored at a logical address LA is received by a node of a data storage system, the HT1 1142 of the mapping cache 1104 can be queried to determine whether the mapping cache 1140 includes a corresponding cached descriptor for LA. If so, a hit is determined with respect to the mapping cache 1104 and the physical address or location information of the cached descriptor can be used to read the requested read data from the non-volatile BE storage 1112. In this case, the data flow to service the read hit of the mapping cache 1104 is denoted by the data flow arrows 1104*a-b* as: from the mapping cache 1104 to the compression/decompression engine 1110, to the storage 1112 where the content is read and returned to the engine 1110 for decompression (if any), and returned to the mapping cache layer 1104. From here, the returned data can be further returned to the host or other client originating the read I/O. As discussed in more detail elsewhere herein, the cached descriptor for the LA can also include other information relevant to the LA and its stored content. In at least one embodiment, the descriptor can include a hash value, such as a cryptographic hash value, which can be used to validate the returned content (e.g., which is returned along data flow or path 1104*b*).

As noted above, the mapping cache 1140 can also include the hash table 2 HT2 1144. Using HT2 1144, the descriptors can be indexed, accessed and organized using keys which are physical addresses or locations and where the cached content or values are the cached page descriptors for corresponding physical addresses or locations. Each such physical address or location P1 can store content of a logical address LA where the corresponding cached descriptor D1 includes information identifying P1 and LA. In at least one embodiment, the cached descriptor D1 can be included in both HT1 1142 and HT2 1144 where the same descriptor D1 can be indexed or accessed, respectively, using both a logical address and a physical address. Using HT2 1144, processing can map a physical address to a corresponding descriptor, if such descriptor is stored in the mapping cache 1104. In at least one embodiment as illustrated by element 1140, the mapping cache can be implemented using the hash table HT2 1144 with entries or indices. A physical address or location 1144*a* can be mapped, such as using a hash function F2, to an entry or index j2 of the hash table2 HT2 1144, denoted as HT2(j2), where HT(j2) is associated with or includes one or more page descriptors 1142*b* each with a corresponding physical address mapped by F2 to HT2(j2). Each of the cached page descriptors 1144*b* can include multiple fields of information related to the mapped logical address. One of the fields of information of each cached page descriptor 1144*b* is a logical address storing the content contained at the physical address or location 1144*a*. As discussed in more detail below, the hash table 2 HT2 1144 can be used in connection with maintaining coherency in the mapping cache 1140. In connection with certain workflows and operations discussed below, HT2 1144 can be used when a physical address or location P1 is known to return a corresponding logical address LA having content C1 as stored at P1. Thus in one aspect, HT1 can be characterized as providing a mapping from a logical address LA1 to a corresponding physical address or location P1 storing content of LA1; and HT2 can be characterized as providing a mapping from the physical address or location P1 to its corresponding logical address LA having its content stored at P1.

Additional detail regarding the mapping cache 1104, 1140 and its use in connection with the techniques of the present disclosure are described in more detail in the following paragraphs.

What will now be described are ways in which the cached page descriptors of the mapping cache can be implemented and managed in embodiments in accordance with the techniques of the present disclosure.

In at least one embodiment, the page descriptors can be logically partitioned into two groups or sets: in use descriptors and free descriptors. One or more suitable policies can be used in connection with management of the page descriptors of the two groups or sets. Additionally, the descriptors of each of the two groups or sets can be implemented using any suitable data structures. The in use descriptors and the free descriptors can each be managed independently using different policies and/or structures.

In at least one embodiment, descriptors included in the in use group or set can be those descriptors which are currently stored in the mapping cache and associated with entries of the hash tables HT1 and HT2 of the mapping cache. Each descriptor stored in the mapping cache can be associated with only a single hash table entry or index of HT1 1142. In at least one embodiment, each hash table entry or index j of HT1, HT1(j), can generally be associated with one or more descriptors each having a corresponding logical address LA which is mapped to the entry or index j by a hash function or algorithm F, where F(LA)=j. In at least one embodiment, each hash table entry or index HT1(j) can be associated with a linked list of descriptors which are mapped to HT1(j). In at least one embodiment, the linked list associated with each HT1(j) can be implemented as a singly linked list using next pointers, where each linked list entry can include a next pointer to its immediately next linked list entry, if any. Thus, the HT1(j) linked list can be characterized in one aspect as a bucket of one or more descriptors mapped to HT1(j) by F. In at least one embodiment, a head pointer can be maintained for each HT1(j) bucket or linked list where a descriptor added to the entry HT1(j) can be added to the head of the descriptor list associated with HT1(j).

In a similar manner, each descriptor stored in the mapping cache can be associated with only a single hash table entry or index of HT2 1144. In at least one embodiment, each hash table entry or index j2 of HT2, HT2(j), can generally be associated with one or more descriptors each having a corresponding physical address P1 which is mapped to the entry or index j2 by a hash function or algorithm F2, where F2(P1)=j2. In at least one embodiment, each hash table entry or index HT2(j2) can be associated with a linked list of descriptors which are mapped to HT2(j2). In at least one embodiment, the linked list associated with each HT2(j2) can be implemented as a singly linked list using next pointers, where each linked list entry can include a next pointer to its immediately next linked list entry, if any. Thus, the HT2(j2) linked list can be characterized in one aspect as a bucket of one or more descriptors mapped to HT2(j2) by F2. In at least one embodiment, a head pointer can be maintained for each HT2(j2) bucket or linked list where a descriptor added to the entry HT2(j2) can be added to the head of the descriptor list associated with HT2(j2).

In at least one embodiment, all the in use descriptors stored in the mapping cache can collectively be organized as an LRU (least recently used) list or queue of descriptors. Thus each in use descriptor can be included in three lists or queues: a first list or queue associated with a single hash table entry HT1(j) as noted above, a single hash table entry HT2(j2) as noted above, and a list or queue which is the LRU list or queue denoting a collective list of all descriptors across all hash table entries for all hash table 1 HT1 index values of j and all hash table 2 HT2 index values of j2. The LRU queue can be used in connection with overall management, including an eviction policy, for all descriptors cached in the mapping cache. In at least one embodiment, the eviction policy can be an LRU-based policy. In at least one embodiment, the LRU queue can be implemented as doubly linked list using forward and backward pointers, where each linked list entry can include a forward pointer to its immediately next linked list entry, if any; and each linked list entry can include a back pointer to its immediately prior linked list entry, if any.

In at least one embodiment, a head pointer of the LRU queue can point to the least recently used descriptor of the LRU queue, and a tail pointer can point to the most recently used descriptor of the LRU queue. A new descriptor stored in the mapping cache can be added to the tail of the LRU queue. When a cached descriptor of the LRU queue is referenced and used (e.g., such as in connection with read I/O processing and a hit occurs with respect to the hash table of the mapping cache), in at least one embodiment the referenced descriptor can be moved to the tail of the queue. As may be needed, such as when there are no free descriptors and a new descriptor is needed where the new descriptor is to be added to the hash table for a corresponding logical address, the new descriptor can be obtained by invalidating or evicting an existing in use descriptor currently stored in the mapping cache. In at least one embodiment using the LRU queue, the in use descriptor which is the LRU entry of the LRU queue at the head of the list can be evicted. The evicted descriptor can be reinitialized or updated and thereby used as the new descriptor for the corresponding logical address. Additionally, the descriptor evicted from the in use LRU queue can also be evicted or removed from the hash table.

Descriptors included in the free group or set can be those descriptors which are currently not in use and not stored in the mapping cache. In at least one embodiment, free descriptors of the free group or set can be included in a singly linked list.

Consistent with other discussion herein, a new or free page descriptor can be obtained and used in connection with I/O processing flows for an I/O operation which reads data from, or writes data to, a target logical address LA. In particular, a new or free page descriptor can be: obtained, and then updated or initialized to include information for the target logical address LA; stored in the mapping cache; associated with a hash table1 entry HT1(j); and associated with a hash table 2 entry HT2(j2). For HT1, the logical address LA can be provided as an input to a hash function or algorithm F and a hash value determined where the hash value denotes the index j mapped to the page descriptor for LA, where F(LA)=j. For HT2, the physical address or location P1 can be provided as an input to a hash function or algorithm F2 and a hash value determined where the hash value denotes the index j2 mapped to the page descriptor for P1, where F2(P1)=j2. In at least one embodiment, the new page descriptor needed can be obtained from the free list or group of descriptors, if there are any such free or available descriptors in the free group. If the free group is empty, or more generally where a free descriptor cannot be obtained from the free group, the new page descriptor can be obtained by evicting a page descriptor from the mapping cache. As noted above in at least one embodiment, the page descriptor evicted from the mapping cache can be the LRU entry of the LRU queue (e.g., the descriptor at the head of the LRU queue). The evicted page descriptor can be designated as now free or available for reuse. The evicted page descriptor can be used as the new page descriptor for the logical address LA, where the evicted page descriptor can be reinitialized or updated to include information corresponding to the logical address LA, added to the mapping cache and associated with HT(j). The new page descriptor can also be added to the LRU queue and placed at the tail of the LRU queue. Additionally, in response to a subsequent reference or hit to a page descriptor in the LRU queue, the referenced page descriptor can be relocated or moved to the tail of the LRU queue.

In at least one embodiment, when an in use descriptor is evicted from an in use LRU queue, the descriptor can also be evicted from the mapping cache and hash tables HT1 and HT2 thereof. In this case, the logical address of the evicted descriptor can be mapped to a corresponding first hash table1 index HT1(j), where the descriptor can be further removed from the bucket or linked list of descriptors of HT(j). In this case, the physical address or location P1 of the evicted descriptor can be mapped to a corresponding second hash table2 index HT2(j2), where the descriptor can be further removed from the bucket or linked list of descriptors of HT(j2).

To further illustrate the foregoing in at least one embodiment, reference is made to FIGS. 7A-E discussed below.

Figure 7A:
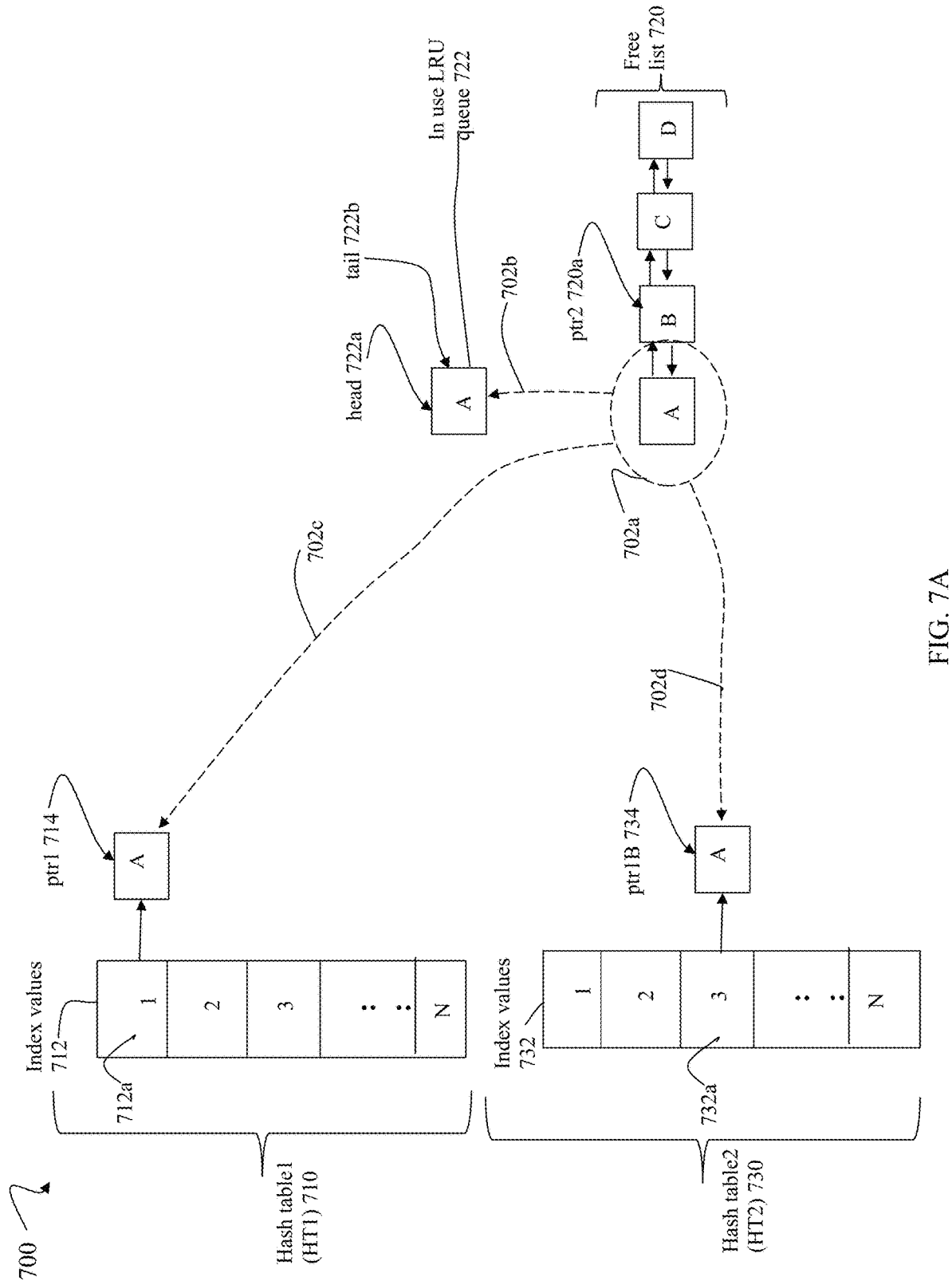

Referring to FIG. 7A, shown is an example 700 illustrating the state of the hash tables HT1 710 and HT2 730, in use LRU queue 722 and free list 720 at a first point in time T1. The free list 720 can include descriptors A, B C and D. At the first point in time, processing can be performed to obtain a new or free descriptor in connection with other processing as discussed elsewhere herein. Responsive to the request for a new or free descriptor, descriptor A can be allocated for use from the free list 720. Element 702a illustrates the removal of descriptor A from the free list 720, where A is added 702b to the in use LRU queue 722, A is added 702c to the hash table 1 (HT1) index or entry 1 (e.g., HT1(1)) 712a, and A is added 702c to the hash table2 (HT2) index or entry 3 (e.g., HT2(3)) 732a.

Element 712 denotes the index values for the hash table HT1 710, where the index values range from 1 to N. Ptr1 714 is a pointer to the head of the linked list or bucket of descriptors associated with index 1 712a.

Element 732 denotes the index values for the hash table HT2 730, where the index values range from 1 to N. Ptr1B 734 is a pointer to the head of the linked list or bucket of descriptors associated with index 3 732a.

Element 722a denotes the head pointer 722a of the in use LRU queue 722, and element 722b denotes the tail pointer 722b of the in use LRU queue 722. Element 720a denotes the pointer to the head of the free list 720.

Generally, the example 700 shows the state of the structures at the first point in time T1 after descriptor A has been removed from the free list 720 and placed in the in use LRU queue 722, placed on the linked list or bucket of descriptors associated with HT1(1) 712a, and placed on the linked list or bucket of descriptors associated with HT2(3) 732a.

It should be noted that although not explicitly discussed in connection with FIGS. 7A-E, each newly obtained descriptor for use with a corresponding logical address can also be updated to include information discussed elsewhere herein for the corresponding logical address.

At a second point in time T2 subsequent to T1, a second page descriptor is needed for use as a new page descriptor. At the second point in time T2, the descriptor B can be allocated for use and removed from the free list 720, and added to the in use LRU queue 722 and both hash tables HT1 710 and HT2 730. In particular in this example, B can be added to the linked list associated with HT1(1) 712a, and added to the linked list associated with HT2(3) 732a.

Figure 7B:
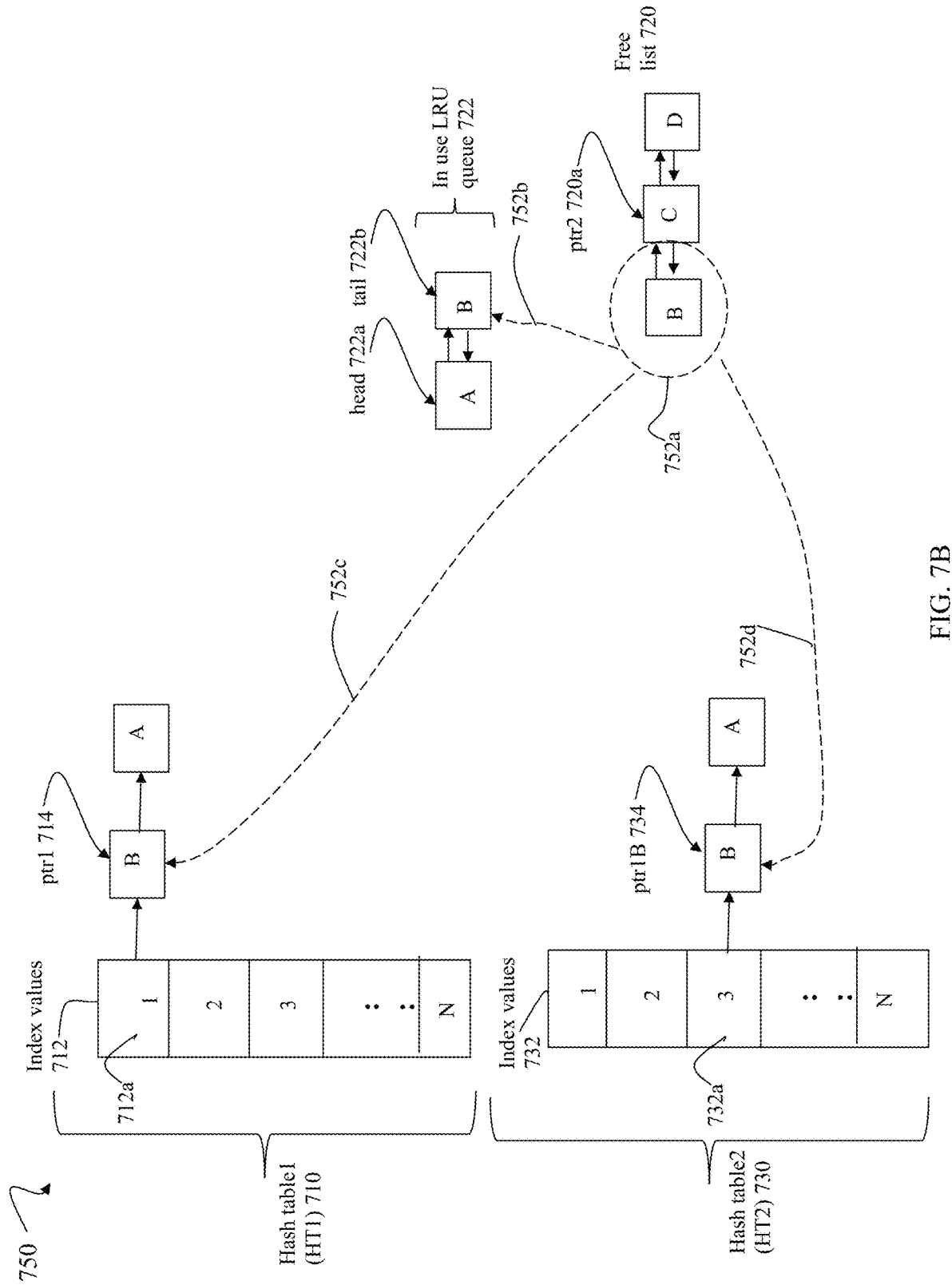

Referring to FIG. 7B, shown is an example 750 illustrating the state of the hash tables 710 and 730, in use LRU queue 722 and free list 720 at time T2 after B has been removed from the free list 720, and added to both the in use LRU queue 722 and hash table 710.

Element 752a illustrates the removal of descriptor B from the free list, where B is then added 752b to the tail 722b of the in use LRU queue 722. Additionally, B is added 752c to the head of the linked list or bucket of descriptors associated with HT1(1) 712a. Also, B is added 752d to the head of the linked list or bucket of descriptors associated with HT2(3) 732a.

At a third point in time T3 subsequent to T2, a two more page descriptors are needed for use as new page descriptors. At the third point in time T3, the descriptors C and D can be allocated for use and removed from the free list 720, and added to both the in use LRU queue 722 and hash tables 710, 730. In particular in this example, C and D can be added to the bucket or linked list associated with HT1(3) 712b; C can be added to HT2(1); and D can be added to HT2(N).

Referring to FIG. 7C, shown is an example 760 illustrating the state of the hash tables 710 and 730, in use LRU queue 722 and free list 720 at time T3 after C and D are removed from the free list 720, and added to the in use LRU queue 722 and hash tables 710 and 730.

Element 764 denotes ptr3 which points to the head of the bucket of descriptors associated with HT1(3) 712b which includes descriptors C and D. Element 762 indicates that the free list 722 is now empty after removal of C and D therefrom.

Element 763b denote ptr1C which points to the head of the bucket of descriptors associated with HT2(1) 763a which includes descriptor C.

Element 765b denote ptr1D which points to the head of the bucket of descriptors associated with HT2(N) 765a which includes descriptor D.

Subsequent to T3 at a fourth point in time T4, there can be a hit or reference to descriptor B included in the bucket or linked list of descriptors associated with hash table index 712a. Consistent with other discussion herein, the hit can occur for example as a result of a read I/O operation or other read request to read content stored at a logical address denoted by a field of descriptor B. In response to the hit or reference to descriptor B at T4, B can be moved 762a to the tail of the in use LRU queue 722.

Figure 7D:
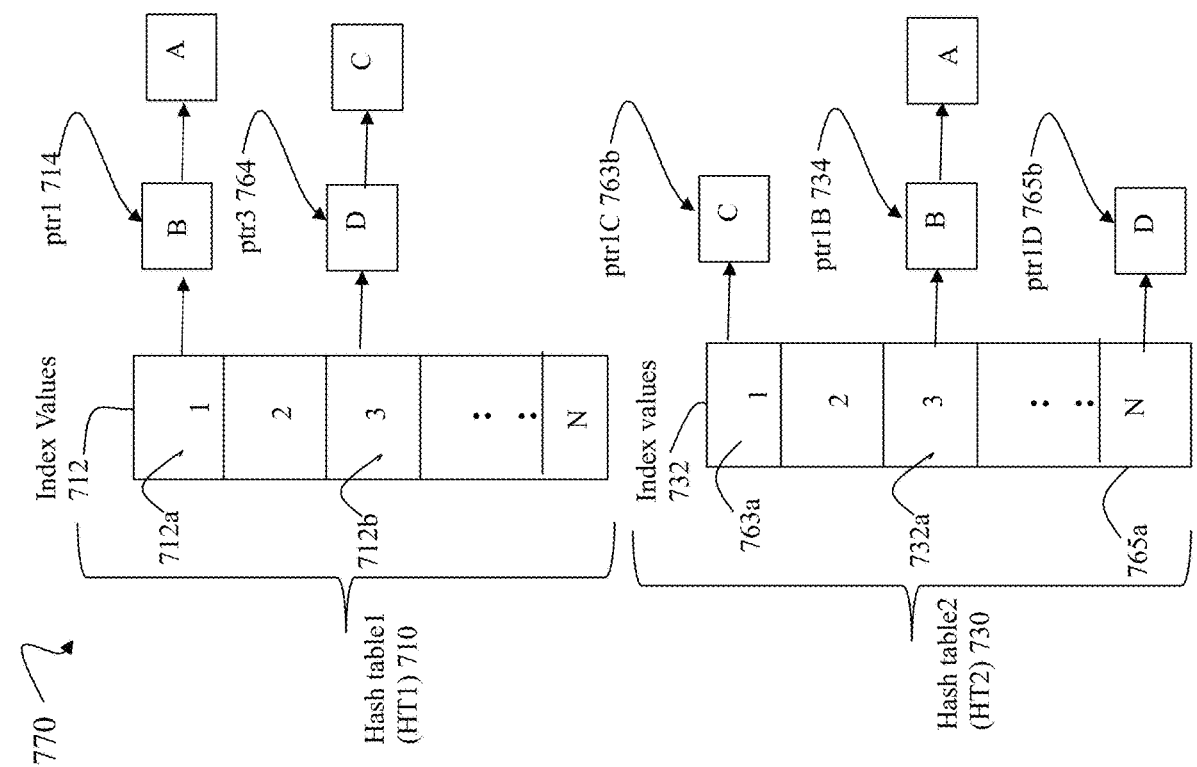

Referring to FIG. 7D, shown is an example 700 illustrating the state of the hash tables 710 and 730, in use LRU queue 722 and free list 720 at time T4 after B is moved to the tail 722b of the in use LRU queue 722.

Subsequent to T4 at a fifth point in time T5, there is another request for a new descriptor. As denoted in FIG. 7D, the free list 720 is empty 762. As a result, a descriptor can be evicted from the mapping cache, and evicted from the hash tables 710 and 730 thereof, where the evicted descriptor can then be used or reused as the new descriptor needed at T5. In this example, a cached descriptor of the in use LRU queue 722 can be selected for eviction in accordance with an eviction policy. In this example, the eviction policy can be LRU based where the LRU cached descriptor of 722 can be evicted. Thus, the LRU or least recently used descriptor is pointed to by the head pointer 722a of the in use LRU queue 722. In the example 770, descriptor A is the LRU descriptor located at the head 722a of the in use LRU queue 722. As a result A can be evicted from the cache and reused as a new descriptor at time T5. Reuse of A can include updating descriptor A and generating the updated or new descriptor A". Thus, in at least one embodiment, A and A" can both denote the same allocated structure or descriptor instance which has been updated at T5 with new information to be A".

The new descriptor A" can be added to the tail of the in use LRU queue 722 and also added to the hash tables 710 and 730. In particular in this example, A can be mapped to hash table1 HT1 index 3 (HT1(3))712b, and A can be mapped to hash table2 HT2 index 1 (HT2(1)) 763a.

Figure 7E:
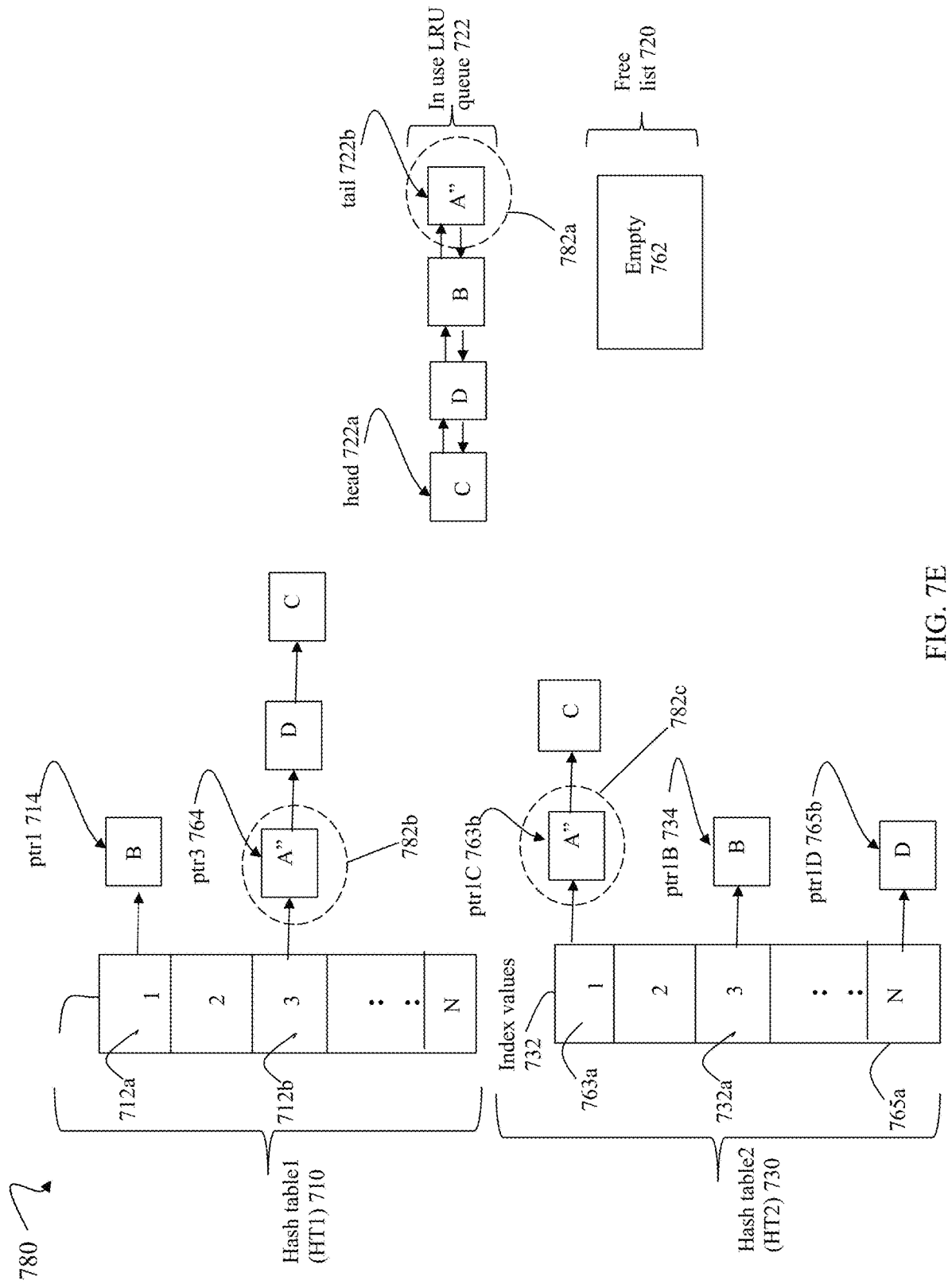

Referring to FIG. 7E, shown is an example 780 illustrating the state of the hash tables 710 and 730, in use LRU queue 722 and free list 720 at time T5: after A is evicted from the LRU queue 722, after A is evicted from the hash tables 710 and 730, after the new descriptor A" is added (782a) to the tail 722b of the in use LRU queue 722, after A" is added (782b) as a new entry in the bucket or linked list associated with HT1(3) 712b; and also after A" is added (782c) as a new entry in the bucket or linked list associated with HT2(1) 763a.

In at least one embodiment, a computer or processing node with a hash table can have multiple processing cores used in connection with performing processing described herein. In this case, multiple processes, threads or other code entities can execute on different cores in parallel where more than one such code entity may attempt to write or modify the same bucket or linked list of cached descriptors associated with one of the hash table indices or entries. Generally, an embodiment can use any suitable mechanism or technique to synchronize access to the same hash table index and its associated bucket of cached descriptors among multiple code entities. In at least one embodiment, each hash table index or entry can have an associated lock, such as a bit lock, which can be used to provide a writer exclusive access to the particular hash table index and its associated bucket of cached descriptors. The writer can be a code entity, for example, which modifies the head pointer of the bucket or linked list and/or other pointers associated with a hash table index or entry in connection with management of the hash table to perform processing as described herein (e.g., add and/or remove descriptors from the hash table).

The foregoing in connection with FIGS. 7A-E illustrate an embodiment in which there is a single in use LRU queue 722. In at least one embodiment of a dual node data storage system in accordance with the techniques of the present disclosure, each node can independently implement and maintain a set of structures as described in connection with FIGS. 7A-7E.

In at least one embodiment, each node of the system can have multiple processing cores used in connection with performing processing described herein. As a variation to the above implementation described in connection with FIGS. 7A-E with a single in use LRU queue, an embodiment can include a per core in use LRU queue. Thus, for example, if a node has 3 processing cores performing processing in accordance with the techniques of the present disclosure, the embodiment can have 3 separate in use LRU queues, one per core. In such an embodiment there can still be a single free list 720 with separate per core in use LRU queues. As yet a further variation, each core can manage and maintain multiple per core in use LRU queues based on the frequency of use of the cached descriptors of the core. Thus, the eviction policy for such per core multiple in use LRU queues can be based on both recency of descriptor use and frequency of descriptor use.

In at least one embodiment, each core can maintain 3 in use LRU queues. Each of the 3 in use LRU queues can have an associated frequency of use range. In at least one embodiment, the 3 frequency of use ranges associated with the 3 in use LRU queues of the single core can be non-overlapping, where the aggregate or combination of the 3 frequency of use ranges can denote a single contiguous range. Descriptors cached in the mapping cache of the node can be used by a particular one of the cores and placed on one of the 3 in use LRU queues of the particular core. In at least one embodiment, the 3 in use LRU queues can denote a high frequency of use, a medium frequency of use and a low frequency of use. More generally, each core can manage and maintain any suitable number of one or more in use LRU queues. A first range H can be associated with the high frequency of use LRU queue, a second range M can be associated with the medium frequency of use LRU queue, and a third range L can be associated with the low range frequency of use LRU queue. Generally L<M<H. For example, L can denote values less than a first threshold TH1, M can denote values greater than TH1 but also less than a second threshold TH2, and H can denote values greater than TH2.

The frequency of use can be specified using any suitable metric measured or observed over any suitable time period. For example, the frequency of use metric for a descriptor can denote a number of hits or accesses of the descriptor in a specified period of time. A cached descriptor can be included in one of the 3 in use LRU queues based on the observed or measured frequency of use of the descriptor. Each of the 3 in use LRU queues can be managed in a manner similar to the in use LRU queue 722 discussed above using a head pointer and a tail pointer, where descriptors can be first added to the tail of the LRU queue and selected for eviction from the head of the LRU queue. For a descriptor located in a first of the in use LRU queues where the descriptor is referenced (e.g., such as by a hit in connection with I/O processing using the hash table of the mapped cache), in response to the reference or hit, the referenced descriptor can be moved or relocated to the tail of the first in use LRU queue. A cached descriptor included in the first in use LRU queue can also be relocated or moved to a second different one of the 3 in use LRU queues of the core as the frequency of use of the cached descriptor changes over time.

Figure 8:
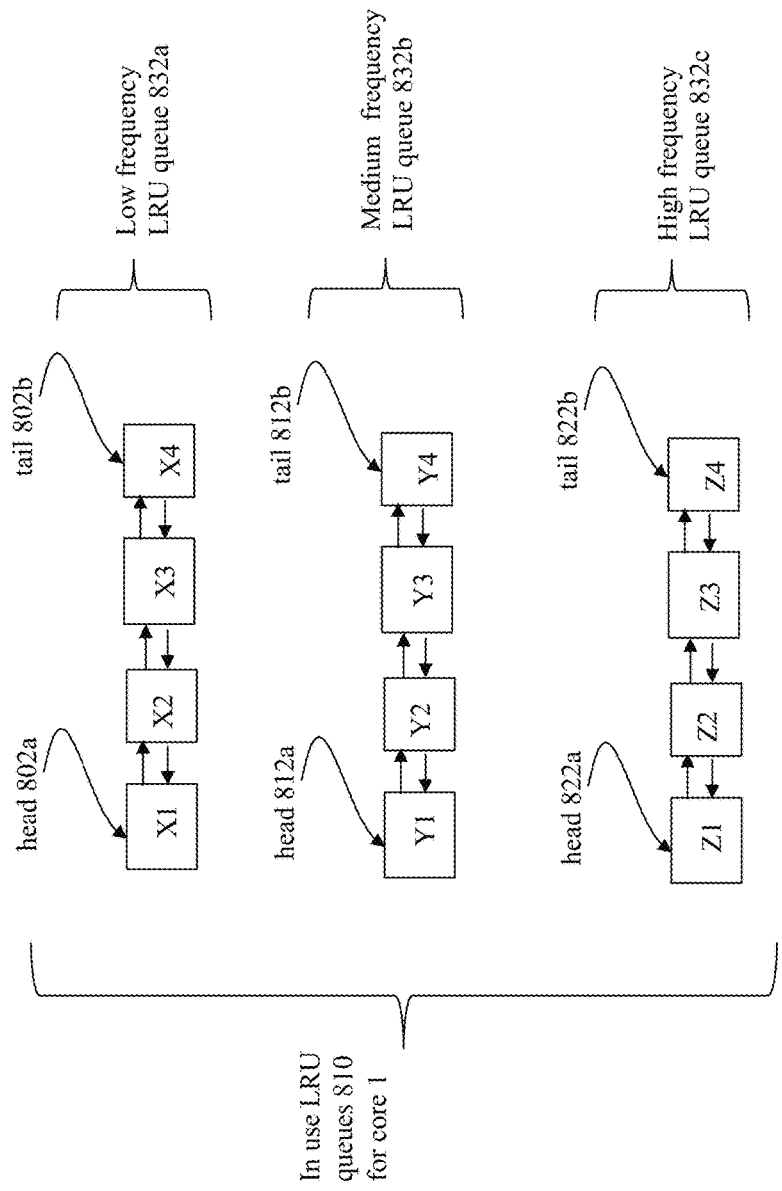

To further illustrate, reference is made to the example 800 of FIG. 8. The example 800 illustrates a set of multiple in use LRU queues which can be maintained and used by each single processing core of a node in at least one embodiment in accordance with the techniques of the present disclosure.

The example 800 includes multiple in use LRU queues 810 for core 1. Each other core can also manage and a separate set of in user LRU queues 810. In at least one embodiment, the in use LRU queues 810 can include 3 queues 832a-c: a low frequency LRU queue 832a; a medium frequency LRU queue 832b and a high frequency LRU queue 832c.

The LRU queue 832a can include descriptors X1-X4 and can be managed using head pointer 802a and tail pointer 802b. Consistent with discussion elsewhere herein, X1 can denote the descriptor of the LRU queue 832a which is least recently used and X4 can denote the descriptor of the LRU queue 832*a* which is most recently used. Each time a descriptor of the LRU queue 832*a* is referenced, it can be moved to the tail 802*b* of the LRU queue 832*a*. For example, if descriptor X2 is referenced, X2 can be moved to the tail 802*b* of the LRU queue 832*a*.

The LRU queue 832*b* can include descriptors Y1-Y4 and can be managed using head pointer 812*a* and tail pointer 812*b*. Consistent with discussion elsewhere herein, Y1 can denote the descriptor of the LRU queue 832*b* which is least recently used and Y4 can denote the descriptor of the LRU queue 832*b* which is most recently used. Each time a descriptor of the LRU queue 832*b* is referenced, it can be moved to the tail 812*b* of the LRU queue 832*b*. For example, if descriptor Y1 is referenced, Y1 can be moved to the tail 812*b* of the LRU queue 832*b*.

The LRU queue 832*c* can include descriptors Z1-Z4 and can be managed using head pointer 822*a* and tail pointer 822*b*. Consistent with discussion elsewhere herein, Z1 can denote the descriptor of the LRU queue 832*c* which is least recently used and Z4 can denote the descriptor of the LRU queue 832*c* which is most recently used. Each time a descriptor of the LRU queue 832*c* is referenced, it can be moved to the tail 822*b* of the LRU queue 832*c*. For example, if descriptor Z2 is referenced, Z2 can be moved to the tail 822*b* of the LRU queue 832*c*.

Periodically, or generally based on a specified policy used to manage the in use LRU queues 832*a-c*, the frequency of use of the cached descriptors can be recorded and used to determine which one of the LRU queues 832*a-c* in which to place each of the cached descriptors. For example, descriptor Z1 can be included in the high frequency LRU queue 832*c* for a first time period. In a second subsequent time period, Z1's frequency of use or number of hits or references can greatly decrease. As a result, Z1 can be relocated in the second period of time from high frequency LRU queue 832*c* to the low frequency LRU queue 832*a* or the medium frequency LRU queue 832*b*. As another example, descriptor X1 can be included in the low frequency LRU queue 832*a* for the first time period. In a second subsequent time period, X1's frequency of use or number of hits or references can greatly increase. As a result, X1 can be relocated in the second period of time from the low frequency LRU queue 832*a* to the high frequency LRU queue 832*c* or the medium frequency LRU queue 832*b*. The particular target or destination LRU queue to which a cached descriptor is moved can depend in the current frequency of use of the descriptor. For example, different thresholds or frequency of use ranges can be associated with each of the in use LRU queues 832*a-c*, where the target or destination can be a selected one of the in use LRU queues 832*a-c* based on the current frequency of use of the descriptor falling into a corresponding range of the selected in use LRU queue.

Based on a defined policy, a new descriptor initially inserted into the mapping cache, and hash tables HT1 and HT2 thereof, can initially be inserted into a selected one of the 3 queues 832*a-c*. For example, the policy can indicate to initially insert a new descriptor D1 for a corresponding first logical address in a default one of the LRU queues such as 832*b* or 832*c*. In at least one embodiment, the first logical address can be in a defined logical address subrange S1 of a LUN or volume. The policy can define a locality of reference condition or criteria used to select one of the LRU queues 832*a-c* in which the initially locate D1. For example, the policy can indicate to initially insert D1 into one of the LRU queues 832*a-c* based on frequency of use of one or more other neighboring cached descriptors. if any, associated with corresponding logical addresses also included in the same logical address subrange S1.

As may be needed, descriptors can be selected for eviction from the multiple in use LRU queues 810. Such eviction can be based on a defined policy. For example, in at least one embodiment, if a core needs a new descriptor for a logical address LA and there are no free descriptors in the free list 720, the core can evict one of its cached descriptors and then reuse the evicted descriptor as the new descriptor in a manner similar to that as discussed in connection with FIG. 7E. For example, assume core 1 needs a new descriptor for use in connection with caching a new descriptor in the mapping cache for a target logical address LA of a write I/O operation. An eviction policy can be defined which specifies that core 1 should evict the LRU cached descriptor from the low frequency LRU queue 832*a*. Thus, core 1 can select the least recently used descriptor of the low frequency LRU queue 832*a* for eviction. In this example 800, the head pointer 802*a* identifies X1 as the least recently used descriptor of the low frequency LRU queue 832*a*, where X1 can be selected for eviction. In at least one embodiment, X1 can then be updated as the new descriptor to include information of the logical address LA. In at least one embodiment, the eviction policy can specify a ranking or ordering in which descriptors of LRU queues can be evicted. The eviction policy can specify to evict all descriptors of the low frequency LRU queue 832*a* before evicting any descriptor of the medium frequency LRU queue 832*b*, and to evict all descriptors of the low and medium frequency LRU queues 832*a-b* before evicting any descriptor of the high frequency LRU queue 832*c*. Consistent with other discussion herein, within each of the individual queues 832*a-c*, descriptors can be evicted from the head of the queue, newly cached or inserted descriptors can be added to the tail of the queue, and descriptors of the queue which are referenced or accessed (e.g., hit) can be moved to the tail of the queue.

In an embodiment using the multiple per core in use LRU queues such as illustrated in FIG. 8, all cores of the node can use a single hash table 710 as discussed elsewhere herein.

Referring to FIG. 9, shown is an example 850 identifying information that can be included in each page descriptor in at least one embodiment in accordance with the techniques of the present disclosure.

The example 850 indicates that each page descriptor 852 can include the following fields of information:

Forward pointer 852*a* and Backward pointer 852*b*: These pointers are used in connection with linking the descriptor 852 into the doubly linked list of an in use LRU queue.

Physical location information of content 852*c*: The field 852*c* identifies a reference, address or pointer to physical location containing content stored at a corresponding logical address denoted by 852*e* of the same descriptor. In at least one embodiment, the field 852*c* can identify a PLB address as well as an offset and length. The offset and length can denote the physical location of the content within the PLB having the PLB address. The physical location of the content can have a starting location denoted by the "offset" within the PLB (pointed to by the PLB address) and a size or length denoted by the "length" of 852*c*. Thus the content can have a starting offset denoted by "offset" and an ending offset denoted by "offset+length".

Core ID (identifier) and queue ID 852*d*: The information in the field 852*d* can be used in embodiments implementing per core in use LRU queues such as illustrated in FIG. 8. The combination of the core ID and queue ID can denote the particular core and particular in use LRU queue of the particular which includes the descriptor 852.

Logical address 852*e*: This is the logical address corresponding to the descriptor 852. The physical location information 852*c* of the descriptor 852 includes the reference, pointer or address of the physical location containing content stored at the logical address 852*e*. In at least one embodiment, the logical address 852*e* can be expressed using a LUN or volume and an LBA or logical offset within the LUN or volume's logical address space.

Hash table1 (HT1) pointer 852*f*: This pointer is used to link the descriptor 852 into a bucket or linked list of descriptors associated with one of the hash table entries or indices, j, of HT1 710 where LA1 is mapped to j in accordance with a hash function or algorithm F (e.g., F(LA1)=j). The pointer 852*f* can point to the next descriptor, if any, in the bucket or linked list of descriptors selected for storing this particular descriptor 852. The descriptor 852 can be added to the head of the bucket or linked list associated with hash table1 index j, HT1(j).

Hash table1 (HT1) pointer 852*g*: This pointer is used to link the descriptor 852 into a bucket or linked list of descriptors associated with one of the hash table entries or indices, j2, of HT2 730 where a physical address P1 is mapped to j2 in accordance with a hash function or algorithm F2 (e.g., F2(P1)=j2). The pointer 852*g* can point to the next descriptor, if any, in the bucket or linked list of descriptors selected for storing this particular descriptor 852. The descriptor 852 can be added to the head of the bucket or linked list associated with hash table2 index j2, HT2(j2).

Checksum or CRC (cyclic redundancy check) code 852*h*: checksums and CRCs are known in the art and can be used to detect invalid data or data corruption, or more generally, verify the integrity of associated data. Generally, the checksum or CRC can denote a value which is computed based on contents stored at the physical address or location identified by the field 852*c* of the descriptor. The checksum or CRC can be computed at the time the contents is stored at the physical address or location identified by the field 852*c* of the descriptor. At a subsequent point in time such as in connection with processing a read I/O operation which requests to read data from a logical address LA1 and which resulting in a mapping cache hit (e.g., where a descriptor D1 for LA1 is stored in the mapping cache), the contents stored at the physical address or location identified by the field 852*c* of the descriptor D1 can be retrieved and a checksum or CRC value V2 can be computed from the retrieved contents. V2 can be compared to V1, where V1 denotes the checksum or CTC value as stored in D1. If V2 and V1 match (e.g., V1=V2), validation processing of the retrieved contents succeeds and can be returned to the client. Otherwise, validation processing of the retrieved contents fails and error processing can be performed since it can be determined that the retrieved contents is corrupt or invalid.

In at least one embodiment, the content or data stored at the physical location 852*c* can be compressed and stored in its compressed form in the physical location 852*c*. In such an embodiment, the CRC or checksum value 852*h* can be computed or applied to the uncompressed or original form of the content.

Referring to FIGS. 10A and 10B, shown is a flowchart 900, 950 of processing that can be performed in at least one embodiment in accordance with the techniques of the present disclosure in connection with a request to obtain a new page descriptor and add the new page descriptor to the mapping cache. The new descriptor can be added to the hash tables HT1 710 and HT2 730 used in connection with accessing descriptors in the mapping cache and can be added to an in use LRU queue used in management of the descriptors in the mapping cache.

At the step 902, a request for a new page descriptor can be received to be add a new page descriptor to the mapping cache, and thus also add the new descriptor to the 2 hash tables, HT1 710 and HT2 730 of the mapping cache. The page descriptor request can be triggered by one of multiple defined operations which results in promoting or adding a descriptor to the mapping cache, the associated hash tables and an in use LRU queue.

The triggering operation can be flushing a logged write I/O operation from the log, where the write I/O writes content C1 to a target logical address LA1. Flushing includes storing C1 to a new physical storage location on BE non-volatile storage.

The triggering operation can be a read I/O operation which is a request to read content C1 from LA1, where the read operation results in a mapping cache miss (e.g., miss with respect to the hash table HT1 of the mapping cache). As a result, C1 is read from a physical storage location on non-volatile BE storage using the mapping information of the chain of MD pages mapping LA1 to the physical storage location. Reading C1 from the non-volatile BE storage can trigger the request to add the new page descriptor, as used to access C1, to the mapping cache.

The triggering operation can be optionally performed responsive to garbage collection processing which relocates content C1 of LA1 from a source physical location to a new target or second physical storage location on non-volatile BE storage. The new page descriptor can be added to the mapping cache, where the new page descriptor can be used to access C1 of LA1, where C1 is now stored at the new target or second physical storage location. The new page descriptor can include information identifying LA1 and the new target or second physical storage location.

The request can generally be made when there is a need for the new page descriptor which is then updated and stored in the mapping cache in subsequent steps. From the step 902, control proceeds to the step 904.

At the step 904, a determination is made as to whether there is a free descriptor on the free list or queue. Responsive to the determining step of 904 evaluating to yes where there is a free descriptor, control proceeds to the step 906 where the free descriptor is allocated from the list as the new descriptor. From the step 906, control proceeds to the step 910.

If the step 904 evaluates to no thereby indicating there is no free descriptor on the free list, control proceeds to the step 908. At the step 908, processing can be performed to obtain a new descriptor by evicting a descriptor from an in use LRU queue, and reusing the evicted descriptor as the new descriptor. The evicted descriptor can be performed in accordance with an eviction policy as described in more detail elsewhere herein depending on the particular structure and policies used in management the cached descriptors of the mapping cache. From the step 908, control proceeds to the step 910.

At the step 910, processing can be performed to update or fill in the information of the new descriptor. With reference back to FIG. 9, the physical location information 852*c* of the new descriptor can be updated to denote the physical location of C1 on non-volatile BE storage. The logical address 852*e* of the new descriptor can be updated to denote the logical address LA1 having content C1 stored at LA1. The CRC or checksum for C1 can be computed and stored in field 852*h* of the new descriptor.

In the step 910, the new descriptor can be added to the hash table1 HT1 of the mapping cache. The index j can be determined for LA1 using a hash function F, where F(LA1)=j, and the new descriptor is added to the bucket or linked list of descriptors associated with HT1(j). The new descriptor can be added or linked to the bucket list of HT1(j) using the head pointer of the linked list and the hash table pointer 852*f* (which points to the next entry in the list, if any).

In the step 910, the new descriptor can be added to the hash table HT2 of the mapping cache. The index j2 can be determined for LA1 using a hash function F2, where F2(LA1)=j2, and the new descriptor is added to the bucket or linked list of descriptors associated with HT2(j2). The new descriptor can be added or linked to the bucket list of HT2(j2) using the head pointer of the linked list and the hash table2 HT2 pointer 852*g* (which points to the next entry in the list, if any).

In the step 910, the new descriptor can be added to the tail of an in use LRU queue using the forward and backward pointers 852*a-b* of the new descriptor. In embodiments using multiple in use LRU queues, such as described in connection with FIG. 8, the core ID and queue ID field 852*d* can further identify the particular in use LRU queue to which the new descriptor is added. From the step 910, control proceeds to the step 912.

At the step 912, processing can be performed to compress C1 and store the compressed form of C1 in the physical storage location denoted by the physical location information field 852*c* of the descriptor.

Figure 11A:
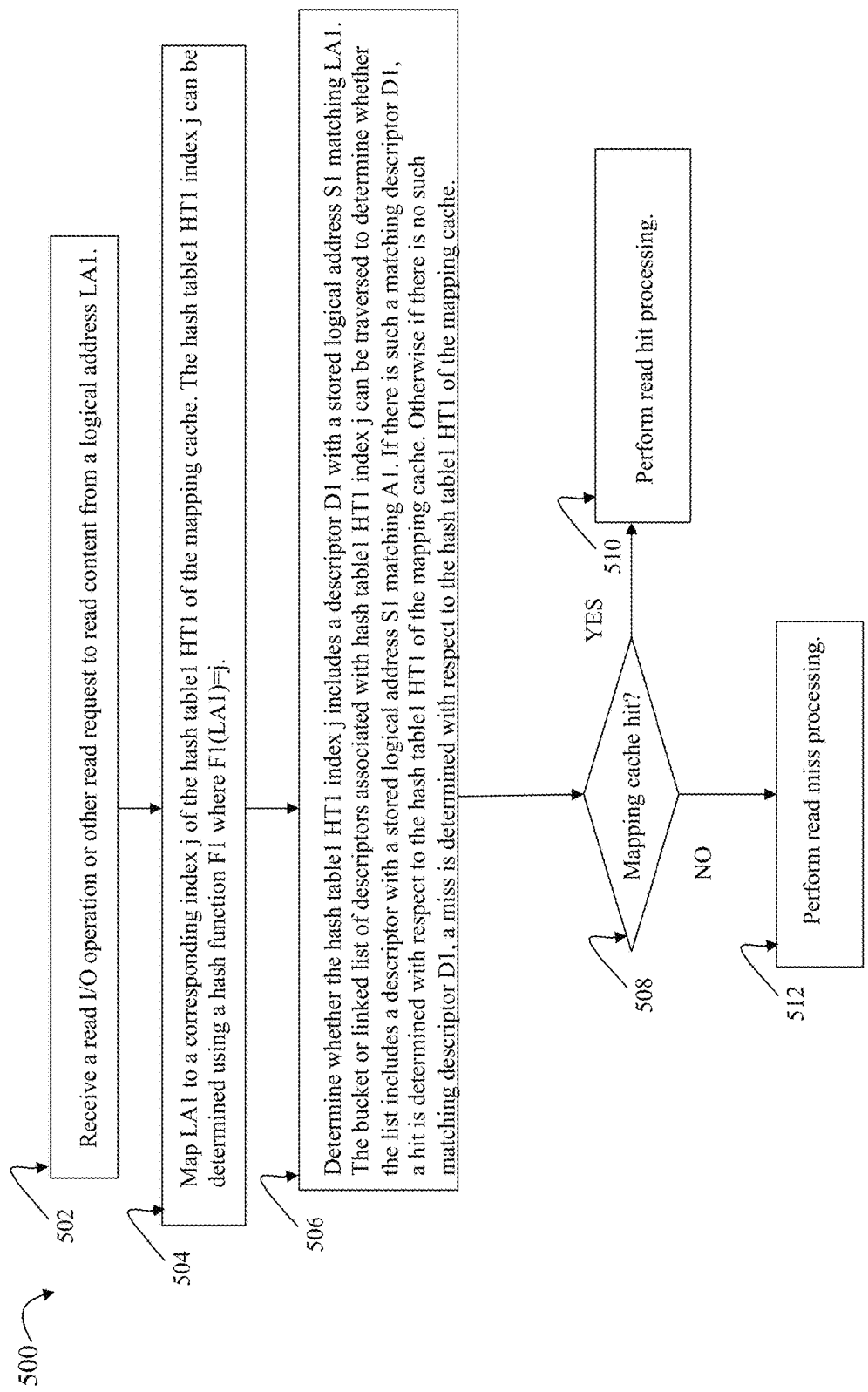

Referring to FIG. 11A, shown is a flowchart 500 of processing that can be performed in connection with servicing a read I/O in at least one embodiment in accordance with the techniques of the present disclosure.

At the step 502, a read I/O or other read request to read content from a logical address A1 can be received. From the step 502, control proceeds to the step 504.

At the step 504, processing can be performed to map LA1 to a corresponding index j of the hash table1 HT1 of the mapping cache. The hash table1 HT1 index j can be determined using a hash function F where F(LA1)=j. From the step 504, control proceeds to the step 506.

At the step 506, processing can be performed to determine whether the hash table1 HT1 index j includes a descriptor D1 with a stored logical address S1 matching LA1. The bucket or linked list of descriptors associated with hash table 1 HT1 index j can be traversed to determine whether the list includes a descriptor with a stored logical address S1 matching A1. If there is such a matching descriptor D1, a hit is determined with respect to the mapping cache, and in particular the hash table1 HT1 of the mapping cache. Otherwise if there is no such matching descriptor D1, a miss is determined with respect to the mapping cache, and in particular the hash table1 HT1 of the mapping cache. From the step 506, control proceeds to the step 508.

Figure 11B:
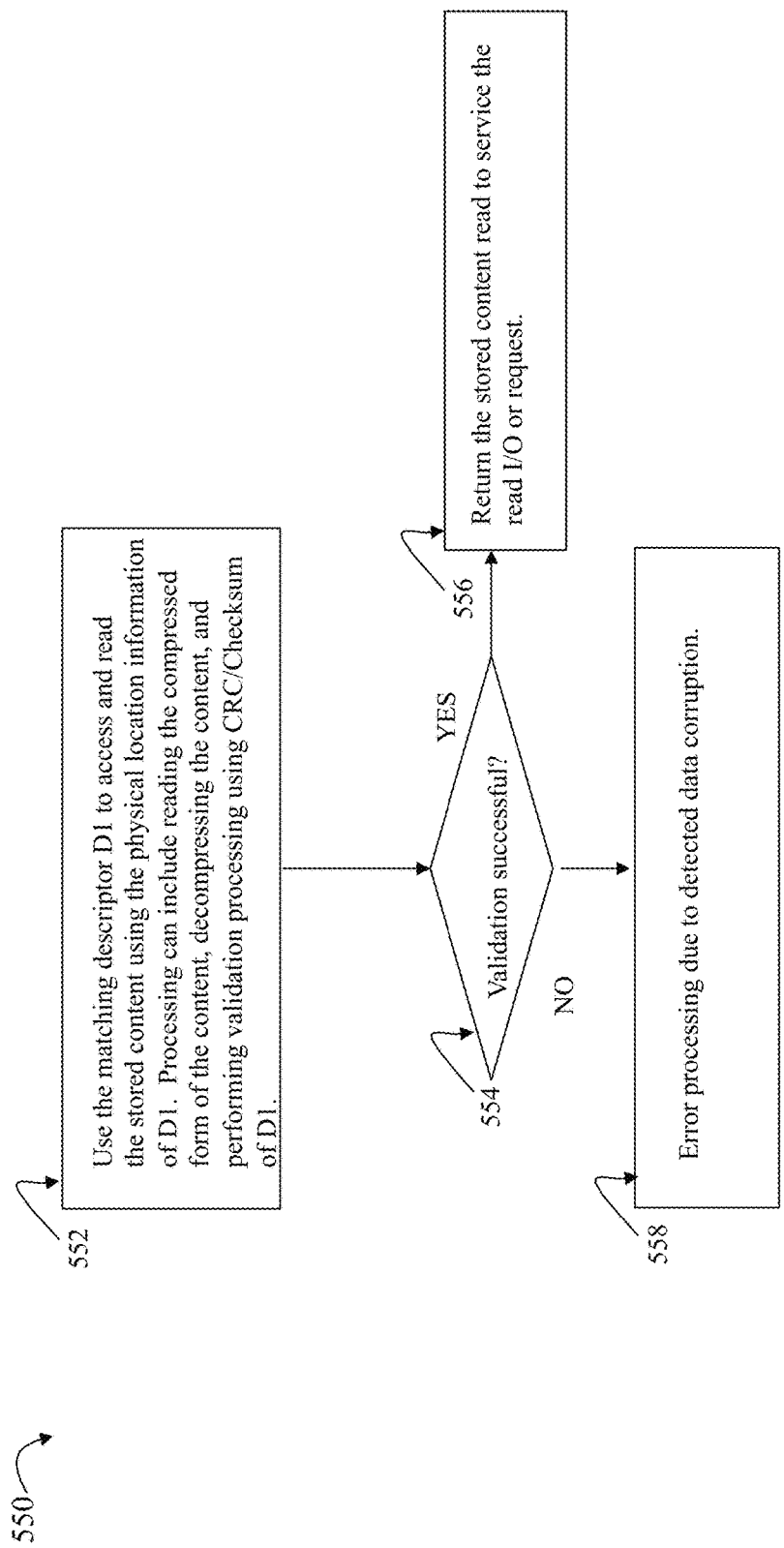

At the step 508, a determination is made as to whether there is a mapping cache hit. A mapping cache hit can be determined if the step 506 locates a matching descriptor D1 in the hash table1 HT1 thereby resulting in the step 508 evaluating to yes. Otherwise, a mapping cache miss is determined thereby resulting in the step 508 evaluating to no. If the step 508 evaluates to yes, control proceeds to the step 510 where read hit processing (sometimes also referred to as mapping cache hit processing or hit processing) is performed. FIG. 11B provides further detail regarding read hit processing in at least one embodiment in accordance with the techniques of the present disclosure.

Figure 11C:
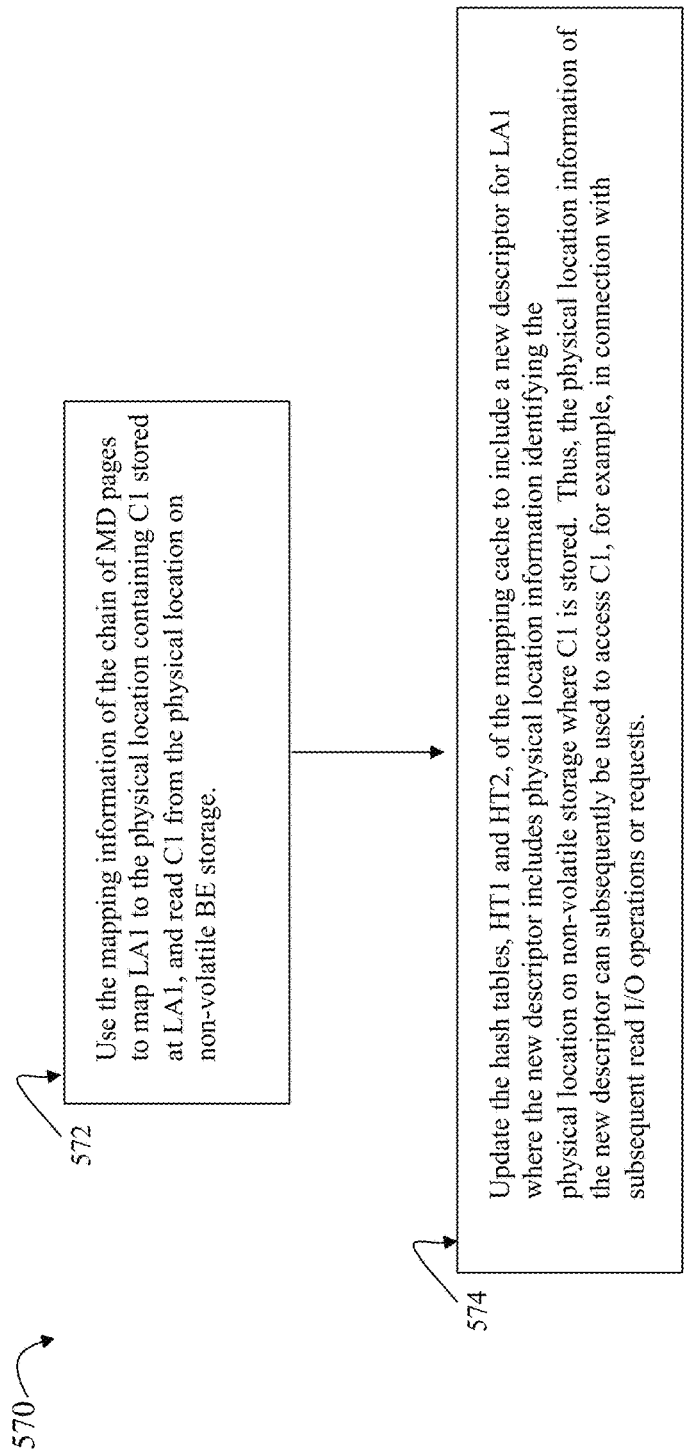

If the step 508 evaluates to no, control proceeds to the step 512 where read miss processing (sometimes also referred to as mapping cache miss processing or miss processing) is performed. FIG. 11C provides further detail regarding read miss processing in at least one embodiment in accordance with the techniques of the present disclosure.

Referring to FIG. 11B, shown is a flowchart 550 of steps that can be performed in connection with read hit processing. Generally, the FIG. 11B provides further detail regarding the step 510 of FIG. 11A.

At the step 552, the matching descriptor D1 (as located in the step 506 of FIG. 11A) can be used to access and read stored content of a physical location identified by the physical location information of D1. Processing of the step 552 can include reading the compressed form of the stored content, decompressing the content, and performing validation processing using the CRC or checksum of D1. Validation processing is described in more detail elsewhere herein. From the step 552, control proceeds to the step 554.

At the step 554, a determination is made as to whether validation processing of step 552 is successful. If the step 554 evaluates to yes whereby validation processing is successful, control proceeds to the step 556. At the step 556, processing can be performed to return the stored content read to service the read I/O or request.

If the step 554 evaluates to no, control proceeds to the step 558 where error processing can be performed due to the detected data corruption of the content for which validation processing of step 554 failed.

Referring to FIG. 11C, shown is a flowchart 570 of steps that can be performed in connection with read miss processing. Generally, the FIG. 11C provides further detail regarding the step 512 of FIG. 11A.

At the step 572, processing can be performed to use the mapping information of the chain of MD pages to map LA1 to the physical location containing C1 stored at LA1, and read C1 from the physical location on non-volatile BE storage. From the step 572, control proceeds to the step 574.

At the step 574, processing can be performed to update the hash tables, HT1 and HT2, of the mapping cache to include a new descriptor for LA1 where the new descriptor includes physical location information identifying the physical location on non-volatile storage where C1 is stored. Thus, the physical location information of the new descriptor can subsequently be used to access C1, for example, in connection with subsequent read I/O operations or requests. Additional detail regarding processing that can be performed in the step 574 is illustrated in FIGS. 10A-B where the step 574 generates a request to trigger or add a new descriptor to the mapping cache.

Figure 12:
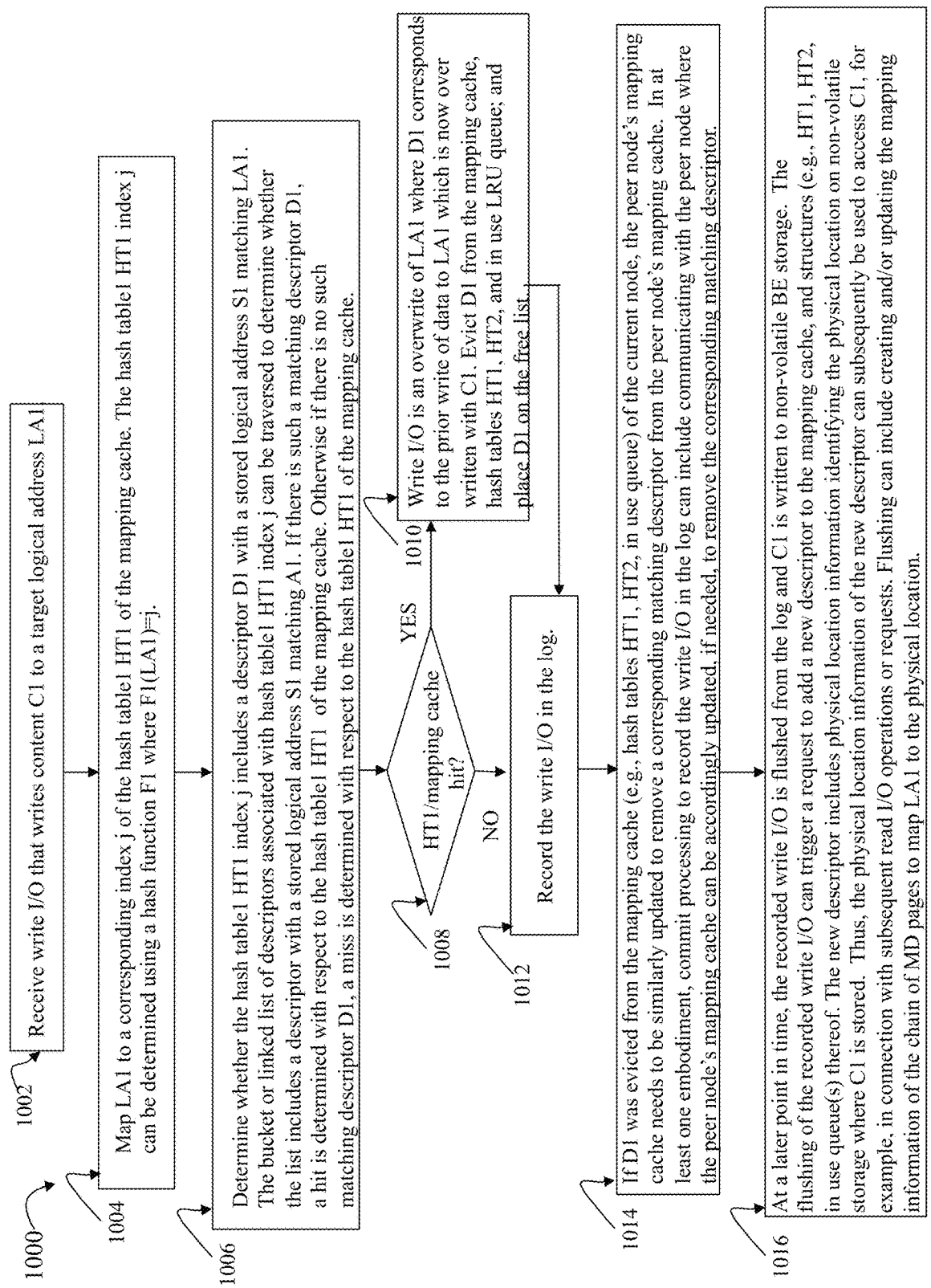

Referring to FIG. 12, shown is a flowchart 1000 of processing steps that can be performed in connection with write I/O processing in at least one embodiment in accordance with the techniques of the presented disclosure.

At the step 1002, a write I/O can be received that writes content C1 to a target logical address LA1. From the step 1002, control proceeds to the step 1004.

At the step 1004, processing can be performed to map LA1 to a corresponding index j of the hash table 1 HT1 of the mapping cache. The hash table1 HT1 index j can be determined using a hash function F where F(LA1)=j. From the step 1004, control proceeds to the step 1006.

At the step 1006, processing can determine whether HT1(j) includes a descriptor D1 with a stored logical address S1 matching LA1. The bucket or linked list of descriptors associated with hash table1 HT1 index j can be traversed to determine whether the list includes a descriptor with a stored logical address S1 matching A1. If there is such a matching descriptor D1, a hit is determined with respect to HT1 of the mapping cache. Otherwise if there is no such matching descriptor D1, a miss is determined with respect to HT1 of the mapping cache. From the step 1006, control proceeds to the step 1008.

At the step 1008, a determination is made as to whether there is a mapping cache hit whereby the step 1006 has located a matching descriptor D1 in HT1 and the step 1008 evaluates to yes. Otherwise, there is a mapping cache miss where the step 1006 has not located a matching descriptor D1 and the step 1008 evaluates to no.

If the step 1008 evaluates to yes, control proceeds to the step 1010. At the step 1010, processing determines that the write received in the step 1002 is an overwrite of LA1 where D1 corresponds to the prior write of data to LA1 which is now overwritten with C1. The step 1010 can include evicting D1 from the mapping cache, hash tables HT1 and HT2, and in use LRU queue; and placing D1 on the free list. In connection with such eviction, D1 can be evicted from HT1(j) as identified in the step 1006. The located matching descriptor D1 also identifies a physical address or location P1 in the field 852c which can be used to index into the hash table2 HT2. In particular, P1 can be mapped by a hash function F2 to an index j2 of HT2, where HT2(j2) includes a bucket or linked list of descriptors mapped to HT2(j2). The foregoing bucket or linked list of descriptors mapped to HT2(j2) can be searched to locate a descriptor on the list having a physical address matching P1 where such matching descriptor denotes D1 which can be removed from the linked list of descriptors mapped to HT2(j2). From the step 1010, control proceeds to the step 1012. If the step 1008 evaluates to no, control proceeds directly to the step 1012.

At the step 1012, processing can be performed to record the write I/O in the log. From the step 1012, control proceeds to the step 1014.

At the step 1014, if D1 was evicted from the mapping cache (e.g., HT1, HT2 and in use queue of the current node) in the step 1010, the peer node's mapping cache needs to be similarly updated to remove a corresponding matching descriptor. In at least one embodiment, commit processing to record the write I/O in the log can include communicating with the peer node where the peer node's mapping cache can be accordingly updated, if needed, to remove the corresponding matching descriptor. Thus, the step 1014 can be conditionally performed if prior processing executed the step 1010. From the step 1014, control proceeds to the step 1016.

At the step 1016, at a later point in time, the recorded write I/O is flushed from the log and C1 is written to non-volatile BE storage. The flushing of the recorded write I/O can trigger a request to add a new descriptor to the hash table of the mapping cache. The new descriptor includes physical location information identifying the physical location on non-volatile storage where C1 is stored. Thus, the physical location information of the new descriptor can subsequently be used to access C1, for example, in connection with subsequent read I/O operations or requests. Flushing can include creating and/or updating the mapping information of the chain of MD pages to map LA1 to the physical location. Additional detail regarding processing that can be performed in the step 1016 is illustrated in FIGS. 10A-B where the step 1016 generates a request to trigger or add a new descriptor to the mapping cache.

Figure 13B:
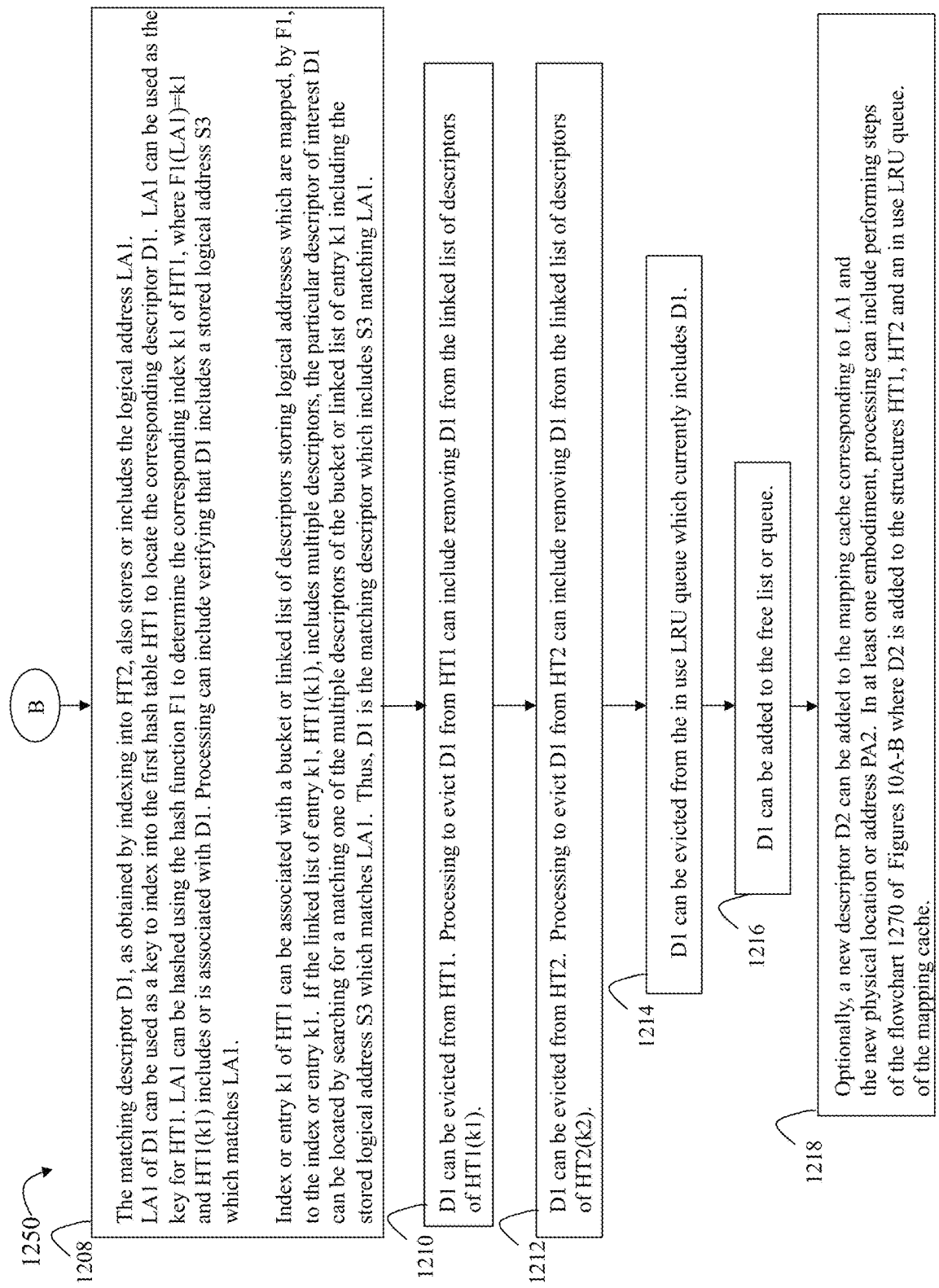

What will now be described in connection with the flowchart 1200, 1250 of FIGS. 13A-13B is processing that can be performed in at least one embodiment in accordance with the techniques of the present disclosure responsive to garbage collection processing relocating contents C1 stored at a first physical address or location PA1 to a new physical address or location PA2. Consistent with other discussion herein, such relocation of content can be performed when garbage collection is aggregating and consolidating valid content from multiple source blocks, such as multiple source PLBs, to a single target block, such as single target PLB. In this case, the source PLBs can contain a mix of both valid and invalid data thereby forming holes in the source PLBs. For example, garbage collection processing can include aggregating and consolidating valid content from 2 source PLBs which each do not store more than 50% valid content and with the remaining storage being invalid or unused storage. In this case, the valid content of the 2 source PLBs can be relocated or moved to a single target PLB thereby freeing or making available for reuse the 2 source PLBs. Responsive to such relocation as a result of garbage collection, FIGS. 13A-13B describe processing which can be performed to evict a corresponding descriptor D1 including PA1 from the mapping cache, and thus evict D1 from HT1, HT2 and an in use LRU queue. Additionally and optionally, processing can further include adding a new descriptor D2 to the mapping cache.

At the step 1202, garbage collection processing can relocate content C1 stored at logical address LA1 from a first physical address or location PA1 (e.g., a source physical address or location) to a second physical address or location PA2 (destination physical address or location). A descriptor D1 corresponding to LA1 and PA1 can be currently cached in the mapping cache and included in both the first hash table HT1 and the second hash table HT2. Additionally, D1 can be currently included in an in use LRU queue. With the GC relocation of C1 from PA1 to PA2, cached D1 of the mapping cache is now invalid.

Responsive to the GC relocation of C1 from PA1 to PA2 thereby invalidating D1 of the mapping cache, subsequent processing steps can be performed to evict the invalid D1 from the mapping cache. In particular, subsequent processing steps can include updating relevant mapping information, evicting the invalid descriptor D1 both HT1 and HT2, evicting D1 from the in use LRU queue currently including D1, and adding the evicted descriptor D1 to the free list or queue of free descriptors available for use.

LA1 can be used as a key to index into HT1, where LA1 is mapped, by a hash function F1, to an index k1 of HT1, and where F1(LA1)=k1. PA1 can be used as a key to index into HT2, where PA1 is mapped, by a hash function F2, to an index k2 of HT2, where F2(PA1)=k2. From the step 1202, control proceeds to the step 1204.

At the step 1204, mapping information including the chain of metadata pages can be updated, where the mapping information is updated to map LA1 to PA2 rather than PA1. In particular, the VLB entry of the VLB page of the chain of mapping information can be updated so that the VLB entry references or points to PA2 rather than PA1. From the step 1204, control proceeds to the step 1206.

At the step 1206, using PA1 (the old or source physical address or location) and the second hash table HT2, processing can index into HT2 to locate a corresponding descriptor D1. PA1 can be used as the key for HT2. PA1 can be hashed using the hash function F2 to determine the corresponding index k2 of HT2, where F2(PA1)=k2 and HT2(k2) includes or is associated with D1. PA1 can be stored as a value in a field of D1. Additionally, LA1 can be stored as a value in D1. Processing can include verifying that D1 includes a stored physical address or location S2 which matches PA1.

Index or entry k2 of HT2 can be associated with a bucket list or linked list of descriptors storing physical addresses or locations of content which are mapped, by F2, to the index or entry k2. If the bucket or linked list of entry k2, HT2(k2), includes multiple descriptors, the particular descriptor of interest can be located by searching for a matching one of the multiple descriptors of the bucket or linked list of entry k2 including the stored physical address S2 which matches PA1. Thus, D1 is the matching descriptor which includes S2 matching PA1. From the step 1206, control proceeds to the step 1208.

At the step 1208, the matching descriptor D1, as obtained by indexing into HT2, also stores or includes the logical address LA1. LA1 of D1 can be used as a key to index into the first hash table HT1 to locate the corresponding descriptor D1. LA1 can be used as the key for HT1. LA1 can be hashed using the hash function F1 to determine the corresponding index k1 of HT1, where F1(LA1)=k1 and HT1(k1) includes or is associated with D1. Processing can include verifying that D1 includes a stored logical address S3 which matches LA1.

Index or entry k1 of HT1 can be associated with a bucket or linked list of descriptors storing logical addresses which are mapped, by F1, to the index or entry k1. If the linked list of entry k1, HT1(k1), includes multiple descriptors, the particular descriptor of interest D1 can be located by searching for a matching one of the multiple descriptors of the bucket or linked list of entry k1 including the stored logical address S3 which matches LA1. Thus, D1 is the matching descriptor which includes S3 matching LA1. From the step 1208, control proceeds to the step 1210.

At the step 1210, D1 can be evicted from HT1. Processing to evict D1 from HT1 can include removing D1 from the linked list of descriptors of HT1(k1). From the step 1210, control proceeds to the step 1212.

At the step 1212, D1 can be evicted from HT2. Processing to evict D1 from HT2 can include removing D1 from the linked list of descriptors of HT2(k2). From the step 1218, control proceeds to the step 1216.

At the step 1216, D1 can be added to the free list or queue of free descriptors. From the step 1216, control proceeds to the step 1218.

In at least one embodiment, the step 1218 can be an optional step optionally performed as part of the processing responsive to garbage collection processing relocated stored content from PA1 to PA2.

At the step 1218, optionally, a new descriptor D2 can be added to the mapping cache corresponding to LA1 and the new physical location or address PA2. In at least one embodiment, processing can include performing steps of the flowchart 1270 of FIGS. 10A-B where D2 is added to the structures HT1, HT2 and an in use LRU queue of the mapping cache.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A system comprising:
one or more processors; and
a memory comprising code stored thereon that, when executed, performs a method comprising:
   receiving, from a host, a read I/O operation requesting to read from a first logical address;
   determining whether a mapping cache includes a first descriptor corresponding to the first logical address, wherein said mapping cache includes a first hash table which maps logical addresses to corresponding descriptors, and wherein said mapping cache includes a second hash table which maps physical addresses to corresponding descriptors, wherein said determining whether the mapping cache includes the first descriptor further includes:
      mapping the first logical address to a first index of the first hash table;
      determining whether the first index of the first hash table is associated with the first descriptor corresponding to the first logical address;
      responsive to determining that the first index of the first hash table is not associated with the first descriptor corresponding to the first logical address, determining that the mapping cache does not include the first descriptor corresponding to the first logical address; and
      responsive to determining that the first index of the first hash table is associated with the first descriptor corresponding to the first logical address, determining that the mapping cache does include the first descriptor corresponding to the first logical address; and
   responsive to determining that the mapping cache includes the first descriptor corresponding to the first logical address, performing read hit mapping cache processing which includes using a first physical location identified by the first descriptor to read first content stored at the first logical address; and
   responsive to determining that the mapping cache does not include the first descriptor corresponding to the first logical address, performing read miss mapping cache processing which includes adding the first descriptor to the mapping cache, wherein said adding the first descriptor to the mapping cache includes adding the first descriptor to the first hash table, which is used to access the first descriptor using the first logical address, and adding the first descriptor to the second hash table, which is used to access the first descriptor using the first physical location.

2. A computer-implemented method comprising:
receiving, from a host, a read I/O operation requesting to read from a first logical address;
determining whether a mapping cache includes a first descriptor corresponding to the first logical address, wherein said mapping cache includes a first hash table which maps logical addresses to corresponding descriptors, and wherein said mapping cache includes a second hash table which maps physical addresses to corresponding descriptors, wherein said determining whether the mapping cache includes the first descriptor further includes:
  mapping the first logical address to a first index of the first hash table;
  determining whether the first index of the first hash table is associated with the first descriptor corresponding to the first logical address;
  responsive to determining that the first index of the first hash table is not associated with the first descriptor corresponding to the first logical address, determining that the mapping cache does not include the first descriptor corresponding to the first logical address; and
  responsive to determining that the first index of the first hash table is associated with the first descriptor corresponding to the first logical address, determining that the mapping cache does include the first descriptor corresponding to the first logical address; and
responsive to determining that the mapping cache includes the first descriptor corresponding to the first logical address, performing read hit mapping cache processing which includes using a first physical location identified by the first descriptor to read first content stored at the first logical address; and
responsive to determining that the mapping cache does not include the first descriptor corresponding to the first logical address, performing read miss mapping cache processing which includes adding the first descriptor to the mapping cache, wherein said adding the first descriptor to the mapping cache includes adding the first descriptor to the first hash table, which is used to access the first descriptor using the first logical address, and adding the first descriptor to the second hash table, which is used to access the first descriptor using the first physical location.

3. The computer-implemented method of claim 2, where said read hit mapping cache processing further includes:
  obtaining first physical location information from the first descriptor of the first hash table, wherein the first physical location information identifies the first physical location on non-volatile storage including the first content stored at the first logical address;
  reading, using the first physical location information, the first content from the first physical location;
  performing validation processing to validate the first content using a first checksum included in the first descriptor; and
  responsive to said validation processing successfully validating the first content, returning the first content to the host.

4. The computer-implemented method of claim 3, wherein said validation processing to validate the first content includes:
  computing a second checksum for the first content read in said reading;
  determining whether the first checksum of the first descriptor matches the second checksum; and
  responsive to determining that the first checksum and the second checksum match, successfully validating the first content; and otherwise invalidating the first content and failing validation processing of the first content.

5. The computer-implemented method of claim 2, wherein said read miss mapping cache processing includes:
  using mapping information including a chain of metadata pages which maps the first logical address to the first physical location including the first content;
  reading the first content from the first physical location;
  obtaining the first descriptor;
  updating the first descriptor with first information including the first logical address and including first physical location information identifying the first physical location; and
  returning the first content to the host.

6. The computer-implemented method of claim 5, wherein said read miss mapping cache processing mapping the first logical address to the first index of the first hash table;
  adding the first descriptor to a first linked list of descriptors associated with the first index of the first hash table;
  mapping the first physical location to a second index of the second hash table; and
  adding the first descriptor to a second linked list of descriptors associated with the second index of the second hash table.

7. The computer-implemented method of claim 2, wherein the first descriptor is cached in the mapping cache, and wherein the first content, denoting current content stored at the first logical address, is relocated from the first physical location to a second physical location as a result of garbage collection processing performed on non-volatile backend storage including the first physical location and the second physical location.

8. The computer-implemented method of claim 7, wherein the computer-implemented method is performed in a data storage system which implements a log structured system where write I/O operations received are recorded in a log and subsequently flushed from the log.

9. The computer-implemented method of claim 8, further comprising:
  responsive to said garbage collection processing relocating the first content from the first physical location to the second physical location, perform first processing including:
    evicting the first descriptor from the mapping cache, wherein said evicting the first descriptor includes evicting the first descriptor from the first hash table and the second hash table.

10. The computer-implemented method of claim 9, wherein said first processing includes:
  mapping the first logical address to the first index of the first hash table;
  locating the first descriptor in a first linked list associated with the first index of the first hash table; and
  removing the first descriptor from the first linked list.

11. The computer-implemented method of claim 10, wherein said first processing includes:
  using first physical location information of the first descriptor of the first linked list associated with the first index of the first hash table to obtain the first physical location;
  mapping the first physical location to a second index of the second hash table;
  locating the first descriptor in a second linked list associated with the second index of the second hash table; and
  removing the first descriptor from the second linked list.

12. The computer-implemented method of claim 11, wherein said first processing includes:

adding a second descriptor to the mapping cache, wherein the second descriptor includes second information identifying that the first content of the first logical address is stored at the second physical location.

13. The computer-implemented method of claim 12, wherein said adding the second descriptor to the mapping cache includes:
adding the second descriptor to the first hash table; and
adding the second descriptor to the second hash table; and
wherein said adding the second descriptor to the second hash table includes:
mapping the second physical location to a third index of the second hash table; and
adding the second descriptor to a third linked list associated with the third index of the second hash table; and
wherein said adding the second descriptor to the first hash table includes:
mapping the second physical location to the first index of the first hash table; and
adding the first descriptor to the first linked list associated with the first index of the first hash table.

14. The computer-implemented method of claim 11, wherein said first processing includes:
updating mapping information for the first logical address, wherein said updating includes updating the mapping information to map the first logical address to the second physical location rather than the first physical location.

15. The computer-implemented method of claim 14, wherein the mapping information includes a plurality of pages of metadata, wherein a first of the pages is updated to map to the second physical location rather than the first physical location.

16. The computer implemented method of claim 2, further comprising:
receiving a first write I/O operation at the data storage system, wherein the first write I/O writes the second content to the first logical address;
responsive to said receiving the first write I/O operation, recording a first record in the log for the first write I/O operation;
flushing the first record denoting the first write I/O operation from the log; and
storing the second content to a second physical location.

17. The computer-implemented method of claim 16, further comprising:
responsive to said receiving the first write I/O operation, evicting an existing descriptor from the mapping cache, where the existing descriptor corresponds to the first logical address; and
responsive to said flushing, caching a second descriptor for the first logical address and the second physical location in the mapping cache, wherein said caching the second descriptor includes adding the second descriptor to the first hash table and adding the second descriptor to the second hash table.

18. The computer-implemented method of claim 17, wherein the mapping cache includes a plurality of descriptors including the first descriptor, wherein each of the plurality of descriptors is included in both the first hash table and the second hash table, and wherein said each descriptor is also included in a first in use queue of one or more in use queues used for managing the mapping cache.

19. The computer-implemented method of claim 18, wherein the first in use queue includes one or more of the plurality of descriptors ordered in accordance with a least recently used policy, and wherein the method includes:
responsive to said flushing, requesting a free descriptor;
responsive to said requesting a free descriptor, determining there is no free descriptor;
responsive to determining there is no free descriptor, evicting another descriptor from the mapping cache; and
using the evicted another descriptor as the second descriptor.

20. A non-transitory computer readable medium comprising code stored thereon that, when executed, performs a method comprising:
receiving, from a host, a read I/O operation requesting to read from a first logical address;
determining whether a mapping cache includes a first descriptor corresponding to the first logical address, wherein said mapping cache includes a first hash table which maps logical addresses to corresponding descriptors, and wherein said mapping cache includes a second hash table which maps physical addresses to corresponding descriptors, wherein said determining whether the mapping cache includes the first descriptor further includes:
mapping the first logical address to a first index of the first hash table;
determining whether the first index of the first hash table is associated with the first descriptor corresponding to the first logical address;
responsive to determining that the first index of the first hash table is not associated with the first descriptor corresponding to the first logical address, determining that the mapping cache does not include the first descriptor corresponding to the first logical address; and
responsive to determining that the first index of the first hash table is associated with the first descriptor corresponding to the first logical address, determining that the mapping cache does include the first descriptor corresponding to the first logical address; and
responsive to determining that the mapping cache includes the first descriptor corresponding to the first logical address, performing read hit mapping cache processing which includes using a first physical location identified by the first descriptor to read first content stored at the first logical address; and
responsive to determining that the mapping cache does not include the first descriptor corresponding to the first logical address, performing read miss mapping cache processing which includes adding the first descriptor to the mapping cache, wherein said adding the first descriptor to the mapping cache includes adding the first descriptor to the first hash table, which is used to access the first descriptor using the first logical address, and adding the first descriptor to the second hash table, which is used to access the first descriptor using the first physical location.

* * * * *

UNITED STATES PATENT AND TRADEMARK OFFICE
CERTIFICATE OF CORRECTION

Page 1 of 1

PATENT NO. : 12,093,183 B1
APPLICATION NO. : 18/119565
DATED : September 17, 2024
INVENTOR(S) : Ashok Tamilarasan et al.

It is certified that error appears in the above-identified patent and that said Letters Patent is hereby corrected as shown below:

In the Claims

Column 56, Line 13:
In Claim 6, the phrase "mapping cache processing mapping" should read -- mapping cache processing includes: mapping --

Signed and Sealed this
Fifth Day of November, 2024

Katherine Kelly Vidal
*Director of the United States Patent and Trademark Office*